(12) United States Patent
Kim et al.

(10) Patent No.: US 12,434,220 B2
(45) Date of Patent: Oct. 7, 2025

(54) SUPER ABSORBENT POLYMER AND PREPARATION METHOD THEREOF

(71) Applicant: LG Chem, Ltd., Seoul (KR)

(72) Inventors: Yu Jin Kim, Daejeon (KR); Hyeon Choi, Daejeon (KR); Seongkyun Kang, Daejeon (KR); Kiyoul Yoon, Daejeon (KR); Gicheul Kim, Daejeon (KR); Yoon Jae Min, Daejeon (KR); Seul Ah Lee, Daejeon (KR); Ui Seok Chung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 542 days.

(21) Appl. No.: 17/928,475

(22) PCT Filed: Sep. 10, 2021

(86) PCT No.: PCT/KR2021/012330
§ 371 (c)(1),
(2) Date: Nov. 29, 2022

(87) PCT Pub. No.: WO2022/055290
PCT Pub. Date: Mar. 17, 2022

(65) Prior Publication Data
US 2023/0201801 A1 Jun. 29, 2023

(30) Foreign Application Priority Data

Sep. 11, 2020 (KR) .................. 10-2020-0117132
Sep. 9, 2021 (KR) .................. 10-2021-0120214

(51) Int. Cl.
*B01J 20/10* (2006.01)
*B01J 20/12* (2006.01)
(Continued)

(52) U.S. Cl.
CPC .......... *B01J 20/267* (2013.01); *B01J 20/103* (2013.01); *B01J 20/12* (2013.01); *B01J 20/262* (2013.01);
(Continued)

(58) Field of Classification Search
CPC ........ B01J 20/12; B01J 20/103; B01J 20/262; B01J 20/267; B01J 20/3021; B01J 20/3085; B01J 20/28004; B01J 20/28016
See application file for complete search history.

(56) References Cited

U.S. PATENT DOCUMENTS 9,555,393 B2 1/2017 Lee et al.
2012/0289607 A1* 11/2012 Xiong .................. A61L 15/60
119/173

(Continued)

FOREIGN PATENT DOCUMENTS

CN 104667895 A 6/2015
CN 108350189 A 7/2018
(Continued)

OTHER PUBLICATIONS

International Search Report for Application No. PCT/KR2021/012330 mailed Dec. 30, 2021, pp. 1-3.
(Continued)

*Primary Examiner* — Bijan Ahvazi
(74) *Attorney, Agent, or Firm* — Lerner David LLP

(57) ABSTRACT

The present disclosure relates to a super absorbent polymer, and a preparation method thereof. More specifically, it relates to a super absorbent polymer prepared such that agglomeration between pulverized particles is suppressed, and drying efficiency and uniformity of particle size distribution are improved by including a carboxylic acid-based
(Continued)

additive having a specific structure and hydrophobic particles before drying the hydrogel polymer, and a preparation method thereof.

17 Claims, 3 Drawing Sheets

(51) Int. Cl.
  *B01J 20/26* (2006.01)
  *B01J 20/28* (2006.01)
  *B01J 20/30* (2006.01)
(52) U.S. Cl.
  CPC ... *B01J 20/28004* (2013.01); *B01J 20/28016* (2013.01); *B01J 20/3021* (2013.01); *B01J 20/3085* (2013.01)

(56) References Cited

U.S. PATENT DOCUMENTS

| | | |
|---|---|---|
| 2016/0214082 A1* | 7/2016 | Lee ............... C08L 101/14 |
| 2016/0271584 A1 | 9/2016 | Lee et al. |
| 2017/0043319 A1 | 2/2017 | Lee et al. |
| 2017/0050171 A1 | 2/2017 | Yang et al. |
| 2018/0318793 A1 | 11/2018 | Yoon et al. |
| 2020/0093724 A1 | 3/2020 | Kimura et al. |
| 2021/0230377 A1 | 7/2021 | Lee et al. |
| 2022/0143578 A1 | 5/2022 | Park et al. |
| 2022/0193634 A1 | 6/2022 | Min et al. |
| 2023/0241582 A1 | 8/2023 | Park et al. |

FOREIGN PATENT DOCUMENTS

| | | | |
|---|---|---|---|
| EP | 0897304 A1 | 2/1999 | |
| JP | 2002226599 A | 8/2002 | |
| JP | 2005097569 A | 4/2005 | |
| JP | 2013-201947 A | 10/2013 | |
| JP | 2018023473 A | 2/2018 | |
| JP | 2019112527 A | 7/2019 | |
| JP | 2019-531383 A | 10/2019 | |
| JP | 2022-521177 A | 4/2022 | |
| JP | 2022533561 A | 7/2022 | |
| KR | 20150064649 A | 6/2015 | |
| KR | 20150064712 A | 6/2015 | |
| KR | 20160144611 * | 12/2016 | ............... C08F 2/10 |
| KR | 20160144611 A | 12/2016 | |
| KR | 101967807 B1 | 4/2019 | |
| KR | 20210080186 A | 6/2021 | |
| WO | WO-9738740 A1 * | 10/1997 | ......... A61L 28/0026 |
| WO | 2016200054 A1 | 12/2016 | |
| WO | 2018030181 A1 | 2/2018 | |

OTHER PUBLICATIONS

Odian, G. "Principles of Polymerization" John Wiley & Sons, Inc, Dec. 1981, p. 203, ISBN: 0-471-05146-2.
Schwalm, R. "UV Coatings Basics, Recent Developments and New Applications" Elsevier Science, Dec. 2006, p. 115, ISBN-13: 978-0444529794.
Extended European Search Report for Application No. 21867155.0 dated Dec. 4, 2023. 7 pgs.

* cited by examiner

[FIG. 1]
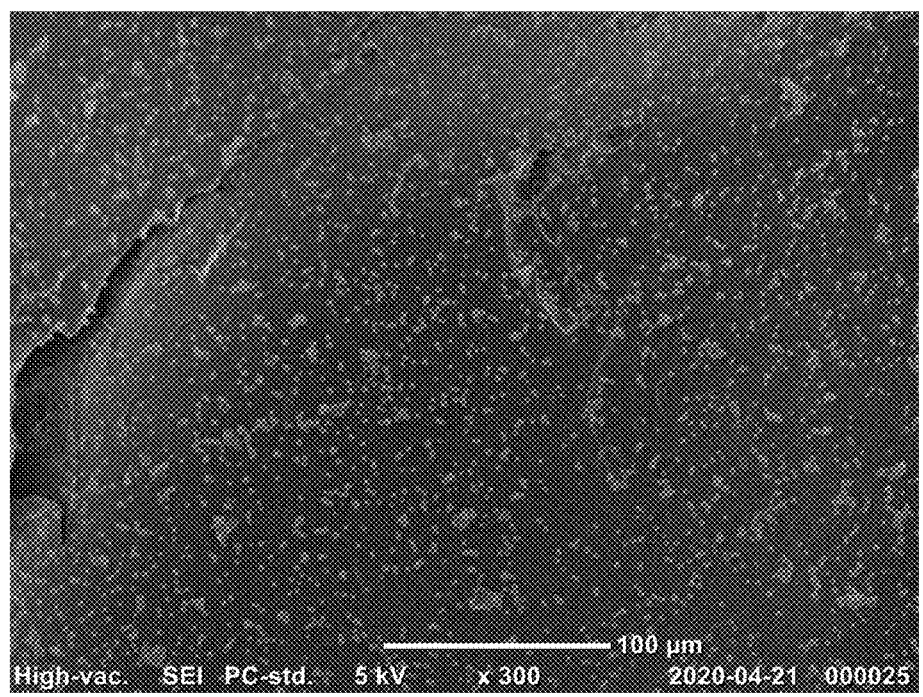
[FIG. 2]
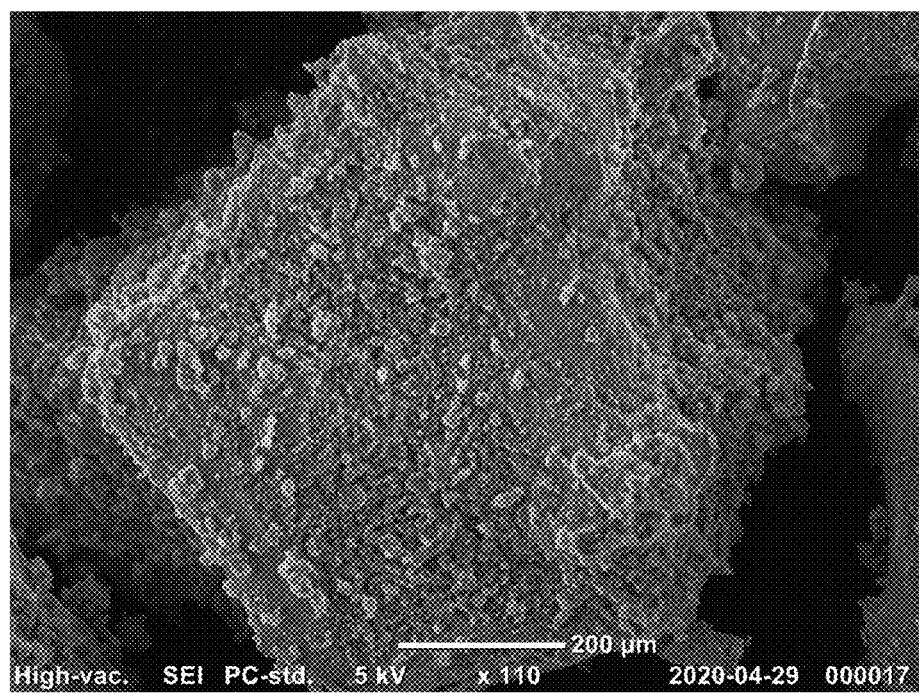

【FIG. 3】
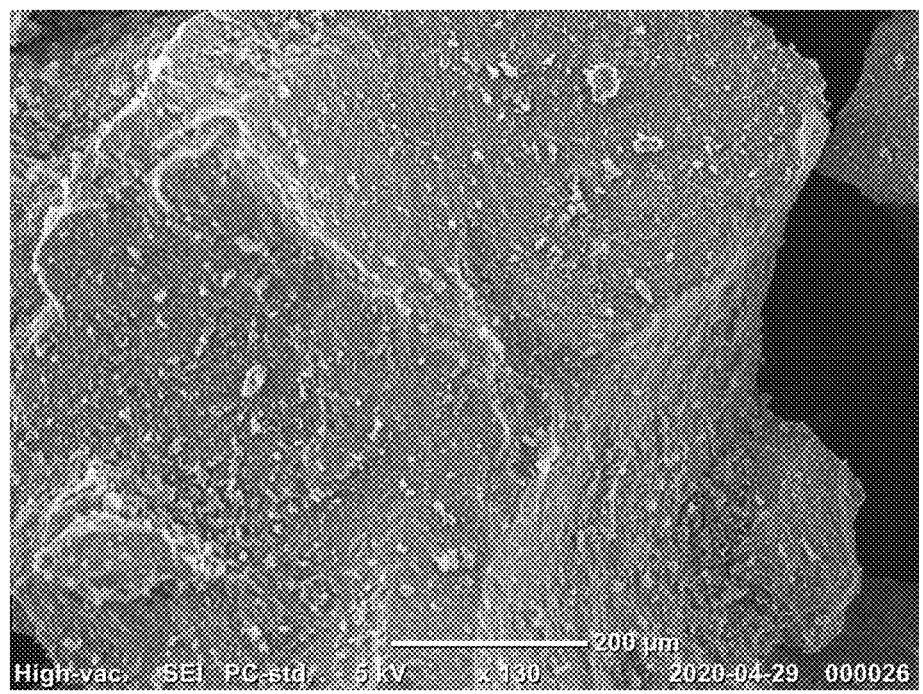
【FIG. 4】
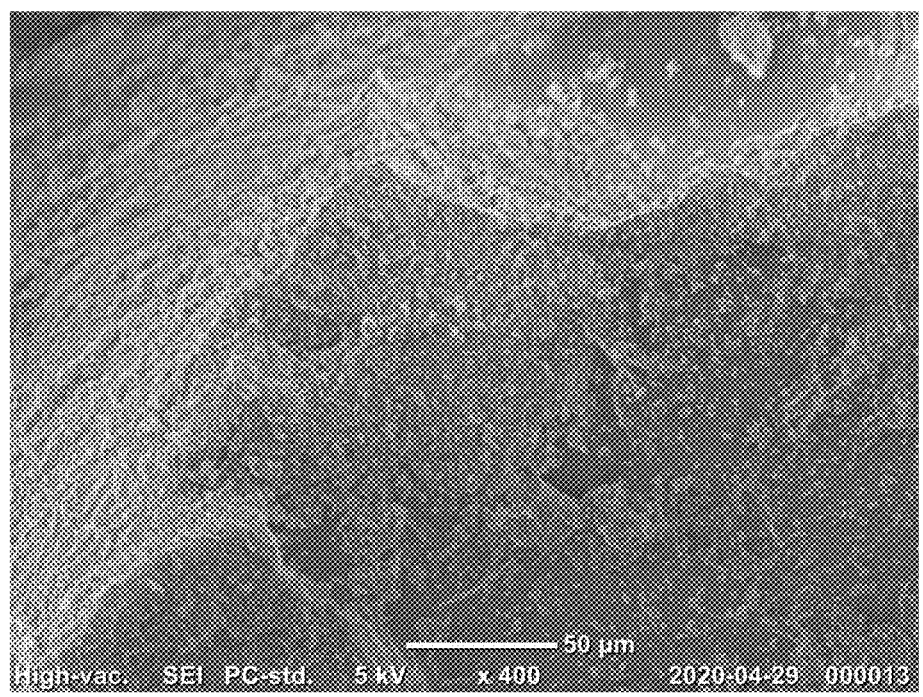

[FIG. 5]
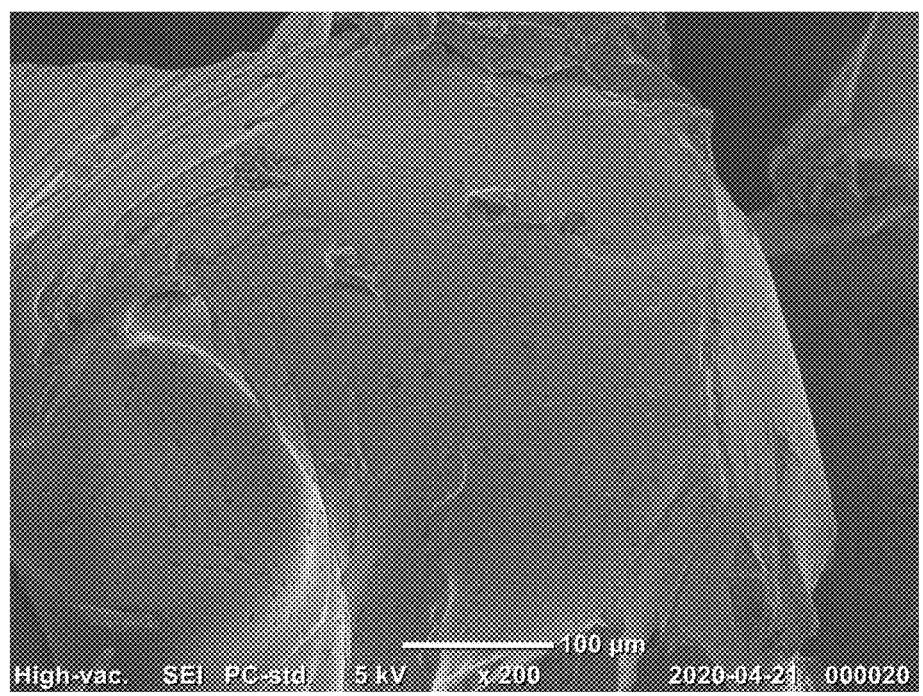

SUPER ABSORBENT POLYMER AND PREPARATION METHOD THEREOF

CROSS-REFERENCE TO RELATED APPLICATIONS

This application is a national phase entry under 35 U.S.C. § 371 of International Application No. PCT/KR2021/012330, filed on Sep. 10, 2021, which claims priority from Korean Patent Application No. 10-2020-0117132, filed on Sep. 11, 2020, and Korean Patent Application No. 10-2021-0120214, filed on Sep. 9, 2021, the disclosures of which are incorporated herein by reference in their entirety.

TECHNICAL FIELD

The present disclosure relates to a super absorbent polymer, and a preparation method thereof. More specifically, it relates to a super absorbent polymer prepared such that agglomeration between polymer particles is suppressed, and drying efficiency and uniformity of particle size distribution are improved by including a carboxylic acid-based additive having a specific structure and hydrophobic particles.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products, but also for water retaining soil products for gardening, water stop materials for the civil engineering and construction, sheets for raising seedling, fresh-keeping agents for food distribution fields, materials for poultices, or the like.

These super absorbent polymers have been widely used in the field of hygienic materials such as diapers or sanitary napkins. In such hygienic materials, the super absorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the pulp content is reduced or pulp is not used at all is being actively advanced.

As described above, in the case of hygienic materials in which the pulp content is reduced or the pulp is not used, a super absorbent polymer is contained at a relatively high ratio and these super absorbent polymer particles are inevitably contained in multiple layers in the hygienic materials. In order for the whole super absorbent polymer particles contained in the multiple layers to more efficiently absorb a large amount of liquid such as urine, it is necessary for the super absorbent polymer to basically exhibit high absorption performance as well as fast absorption rate.

Meanwhile, such a super absorbent polymer is generally prepared by the method including a step of polymerizing a monomer to prepare a hydrogel polymer containing a large amount of moisture, and a step of drying the hydrogel polymer, and then pulverizing the dried hydrogel polymer into polymer particles having a desired particle diameter. Representative examples thereof include a method of aqueous polymerization of neutralized acrylic acid, cutting with a twin-arm kneader, and drying with hot air; a method of aqueous polymerization of neutralized acrylic acid, cutting the hydrogel with a cutter, and drying the thin film with hot air or a drum-type dryer; a method of aqueous polymerization of neutralized acrylic acid, neutralizing and cutting the hydrogel polymer with a cutter, and drying the thin film with hot air or a drum-type dryer; a method in which a high-concentration aqueous solution of acrylate is polymerized while removing the moisture generated during polymerization, followed by drying the polymerization gel while heating; and a method in which neutralized acrylic acid is polymerized by reverse-phase suspension polymerization, and then, if necessary, a solvent and water are removed by heating under reduced pressure.

Particularly, in the case of drying with hot air or a drum-type dryer, since the hydrogel polymer has adhesiveness, a phenomenon in which the hydrogel polymers pulverized during drying adhere to each other occurs, so ventilation of hot air for drying may be deteriorated, thereby lowering drying efficiency.

Accordingly, there is a continuous demand for the development of a technology capable of manufacturing a super absorbent polymer with improved drying efficiency by preventing agglomeration between hydrogel polymers, in addition to improving water retention capacity (CRC) representing basic absorption performance and water-retaining capacity of the super absorbent polymer, and absorbency under pressure (AUP) representing a property of retaining absorbed liquid even under external pressure.

DETAILED DESCRIPTION OF THE INVENTION

Technical Problem

The present disclosure specifically relates to a super absorbent polymer prepared such that agglomeration between pulverized particles is suppressed, and drying efficiency and uniformity of particle size distribution are improved by including a carboxylic acid-based additive having a specific structure and hydrophobic particles before drying the hydrogel polymer, and a preparation method thereof.

Technical Solution

In order to solve the above problems, there is provided a super absorbent polymer including
super absorbent polymer particles containing a cross-linked polymer of a water-soluble ethylene-based unsaturated monomer having at least partially neutralized acidic groups and a cross-linking agent;
hydrophobic particles; and
a carboxylic acid-based additive,
wherein the carboxylic acid-based additive is at least one selected from the group consisting of a carboxylic acid represented by the following Chemical Formula 1 and a salt thereof:

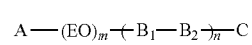

[Chemical Formula 1]

in Chemical Formula 1,
A is alkyl having 5 to 21 carbon atoms,
EO is ethylene oxide (—$CH_2CH_2O$—),
M is an integer of 0 to 8,
$B_1$ is —OCO—, —COO—, or —COOCH($R_1$)COO—, wherein $R_1$ is alkyl having 1 to 5 carbon atoms, $B_2$ is alkylene having 1 to 5 carbon atoms, alkenylene having 2 to 5 carbon atoms, or alkynylene having 2 to 5 carbon atoms, n is an integer of 1 to 3, and C is a carboxyl group.

In addition, there is provided a preparation method of a super absorbent polymer including a first step of forming a hydrogel polymer by cross-linking polymerization of a water-soluble ethylene-based unsaturated monomer having at least partially neutralized acidic groups in the presence of a cross-linking agent and a polymerization initiator;

a second step of mixing the hydrogel polymer with a carboxylic acid-based additive, followed by pulverization;

a third step of mixing the pulverized product prepared in the second step with hydrophobic particles; and a fourth step of drying the mixture prepared in the third step, wherein the carboxylic acid-based additive is at least one selected from the group consisting of a carboxylic acid represented by the Chemical Formula 1 and a salt thereof:

ADVANTAGEOUS EFFECTS

According to the super absorbent polymer of the present disclosure, drying efficiency and uniformity of particle size distribution may be improved by simultaneously including the carboxylic acid-based additive and the hydrophobic particles, thereby exhibiting improved absorption performance. In addition, the super absorbent polymer is pulverized in the presence of the carboxylic acid-based additive, and thus can be pulverized to a desired particle diameter without re-agglomeration between pulverized particles. Further, the super absorbent polymer is dried in the presence of the hydrophobic particles to prevent re-agglomeration between the particles in the drying process, so that the content of large powder included after the drying process can be significantly reduced.

BRIEF DESCRIPTION OF THE DRAWINGS

FIG. 1 shows an SEM image of the surface of super absorbent polymer particles prepared in Example 1.

FIG. 2 shows an SEM image of the surface of super absorbent polymer particles prepared in Example 2.

FIG. 3 shows an SEM image of the surface of super absorbent polymer particles prepared in Example 3.

FIG. 4 shows an SEM image of the surface of super absorbent polymer particles prepared in Example 4.

FIG. 5 shows an SEM image of the surface of super absorbent polymer particles prepared in Comparative Example 1.

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the super absorbent polymer and the preparation method of the same will be described in more detail according to specific embodiments of the present invention.

The terminologies are used merely to refer to specific embodiments, and are not intended to restrict the present disclosure unless it is explicitly expressed. Singular expressions of the present disclosure may include plural expressions unless they are differently expressed contextually.

The terminology "polymer" in the present disclosure is in a state in which a water-soluble ethylene-based unsaturated monomer is polymerized, and may include all moisture content ranges, or all particle diameter ranges. Among the polymers, a polymer having a moisture content of about 40 wt % or more after polymerization and before drying may be referred to as a hydrogel polymer, and particles in which the hydrogel polymer is pulverized and dried may be referred to as a cross-linked polymer.

In addition, the terminology "super absorbent polymer particle" refers to a particulate material containing a cross-linked polymer in which a water-soluble ethylene-based unsaturated monomer having at least partially neutralized acidic groups is polymerized and cross-linked by an internal cross-linking agent.

In addition, the terminology "super absorbent polymer" is used to encompass all of a cross-linked polymer in which a water-soluble ethylene-based unsaturated monomer having at least partially neutralized acidic groups is polymerized or a base resin in the form of powder consisting of super absorbent polymer particles in which the cross-linked polymer is pulverized, and the cross-linked polymer or the base resin further processed, for example, surface cross-linking, fine powder reassembly, drying, pulverization, classification, etc., to be in a state suitable for commercialization, depending on the context. Accordingly, the terminology "super absorbent polymer" may be interpreted as including a plurality of super absorbent polymer particles.

In addition, the terminology "large powder" refers to particles having a particle diameter greater than about 850 μm, and the terminology "fine powder" refers to particles having a particle diameter of less than about 150 μm, and they may be measured in accordance with EDANA (European Disposables and Nonwovens Association) WSP 220.3.

When the dried polymer was pulverized in the pulverizing step essentially required preparing super absorbent polymer particles having a desired particle diameter during the manufacturing process of the super absorbent polymer, a large amount of fine powder was generated, which deteriorated physical properties.

However, a non-dried hydrogel polymer could be coarse-pulverized to have a particle diameter of approximately 1 to 10 mm, but it was impossible to pulverize the non-dried hydrogel polymer to have a particle diameter of less than 1 mm due to agglomeration of pulverized particles.

In addition, in the process of drying the coarsely pulverized hydrogel polymer, agglomeration of the pulverized particles exhibiting adhesiveness occurs, and accordingly, hot air cannot sufficiently pass between the hydrogel polymers. As a result, some of the polymer becomes in an uneven dry state, making it difficult to pulverize the super absorbent polymer particles to have a uniform particle size distribution in the subsequent pulverization process, and some of the polymer becomes overheated, causing a problem in that absorption performance of the super absorbent polymer particles is finally deteriorated.

Therefore, the present inventors have confirmed that pulverizing the hydrogel polymer in the presence of the carboxylic acid-based additive can be performed such that pulverized particles have a desired particle diameter without agglomeration, and additionally adding hydrophobic particles before the drying process not only prevents re-agglomeration during drying, but also increases drying efficiency, so that a super absorbent polymer with a uniform particle size distribution and a significantly reduced content of large powder after the drying process can be prepared, thereby completing the present technology. In particular, the super absorbent polymer has a relatively uniform particle size distribution of the produced super absorbent particles (base resin) compared to the case in which the carboxylic acid-based additive and the hydrophobic particles are not included. Accordingly, the efficiency of surface cross-linking and post-processing of the particles after drying is increased, and when applied as a diaper absorbent, physical properties such as absorption performance (CRC, AUP) and moisture blocking resistance are superior and reproducible.

Specifically, the carboxylic acid-based additive has a hydrophobic functional group and a hydrophilic functional group at the same time. Meanwhile, since the water-soluble ethylene-based unsaturated monomer contains an acidic group (—COOH) and/or a neutralized acidic group (—COO—), a large amount of hydrophilic moiety is present on a surface of the hydrogel polymer prepared by polymerization due to the acidic group (—COOH) and/or the neutralized acidic group (—COO—) remaining without participating in polymerization. Therefore, when the carboxylic acid-based additive is mixed with the hydrogel polymer, a hydrophilic functional group of the additive is adsorbed to at least some part of the hydrophilic moiety present on the surface of the hydrogel polymer, and the surface of the polymer to which the carboxylic acid-based additive is adsorbed becomes hydrophobic by a hydrophobic functional group located at the other end of the carboxylic acid-based additive. Accordingly, agglomeration between polymer particles can be suppressed.

More specifically, in the carboxylic acid-based additive, the hydrophobic functional group is an alkyl group having 5 to 21 carbon atoms (part A), and the hydrophilic functional group is part C, specifically, a carboxyl group (COON) or a carboxylate group (COO—) in the case of a salt. The hydrophobic functional group and the hydrophilic functional group are respectively located at both ends of the additive. In particular, the carboxylic acid-based additive further includes part ($B_1$-$B_2$) in addition to part A and part C at both ends, and the part ($B_1$-$B_2$) improves adsorption performance with respect to the polymer surface, which may be insufficient only with the part C. Accordingly, the additive having the structure of Chemical Formula 1 has excellent adsorption performance with respect to the polymer surface exhibiting hydrophilicity compared to the compound having an A-C structure without the part ($B_1$-$B_2$), and thus effectively inhibits agglomeration of the super absorbent polymer particles.

In addition, when the hydrogel polymer is pulverized in the presence of the carboxylic acid-based additive, the hydrophobic functional group, part A, contained in the additive imparts hydrophobicity to the surface of the pulverized super absorbent polymer particles, thereby reducing frictional force between the particles and increasing bulk density of the super absorbent polymer. Further, the hydrophilic functional group, part C, contained in the additive is also bonded to the super absorbent polymer particles, so that surface tension of the polymer is not lowered.

In addition, when the hydrophobic particles are dispersed in the pulverized hydrogel polymer and then dried, at least some of the hydrophobic particles are present on the surface of the hydrogel polymer. Accordingly, the phenomenon of re-agglomeration between the polymer particles in the drying process is prevented, and thus, it is possible to prepare a super absorbent polymer with a uniform particle size distribution, a low proportion of large powder, and improved absorption performance.

Super absorbent polymer

According to one embodiment of the present disclosure, there is provided a super absorbent polymer including super absorbent polymer particles containing a cross-linked polymer of a water-soluble ethylene-based unsaturated monomer having at least partially neutralized acidic groups and a cross-linking agent; hydrophobic particles; and a carboxylic acid-based additive, wherein the carboxylic acid-based additive is at least one selected from the group consisting of a carboxylic acid represented by the following Chemical Formula 1 and a salt thereof.

[Chemical Formula 1]

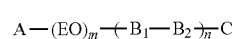

in Chemical Formula 1,

A is alkyl having 5 to 21 carbon atoms,

EO is ethylene oxide (—$CH_2CH_2O$—), m is an integer of 0 to 8, $B_1$ is —OCO—, —COO—, or —COOCH($R_1$)COO—, wherein $R_1$ is alkyl having 1 to 5 carbon atoms, $B_2$ is alkylene having 1 to 5 carbon atoms, alkenylene having 2 to 5 carbon atoms, or alkynylene having 2 to 5 carbon atoms, n is an integer of 1 to 3, and C is a carboxyl group.

Herein, when n is 2 or more, two or more ($B_1$-$B_2$) are the same as or different from each other.

Hereinafter, the super absorbent polymer of one embodiment will be described in more detail for each component.

The super absorbent polymer of one embodiment includes a plurality of super absorbent polymer particles containing a cross-linked polymer of a water-soluble ethylene-based unsaturated monomer having at least partially neutralized acidic groups. At this time, the cross-linked polymer is obtained by cross-linking polymerization of the water-soluble ethylene-based unsaturated monomer having at least partially neutralized acidic groups in the presence of a cross-linking agent, and has a three-dimensional network structure in which main chains formed by polymerization of the monomers are cross-linked by the cross-linking agent.

In other words, the super absorbent polymer of one embodiment includes a plurality of super absorbent polymer particles containing a cross-linked polymer of a water-soluble ethylene-based unsaturated monomer having at least partially neutralized acidic groups and a cross-linking agent. When the cross-linked polymer has a three-dimensional network structure in which main chains formed by polymerization of the monomers are cross-linked by the cross-linking agent, water retention capacity and absorbency under pressure, which are general physical properties of the super absorbent polymer, can be significantly improved compared to the case of having a two-dimensional linear structure that is not further cross-linked by the cross-linking agent.

The water-soluble ethylene-based unsaturated monomer may be any monomer commonly used in the preparation of a super absorbent polymer. As a non-limiting example, the water-soluble ethylene-based unsaturated monomer may be a compound represented by the following Chemical Formula 2:

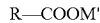   [Chemical Formula 2]

in Chemical Formula 2,

R is an alkyl group having 2 to 5 carbon atoms containing an unsaturated bond, and M' is a hydrogen atom, a monovalent or divalent metal, an ammonium group, or an organic amine salt.

Preferably, the monomer may be at least one selected from the group consisting of (meth)acrylic acid, and a monovalent (alkali)metal salt, a divalent metal salt, an ammonium salt and an organic amine salt of the acid.

When (meth)acrylic acid and/or a salt thereof is used as a water-soluble ethylene-based unsaturated monomer, it is advantageous to obtain a super absorbent polymer having improved absorption performance. In addition, maleic anhydride, fumaric acid, crotonic acid, itaconic acid, 2-acryloylethane sulfonic acid, 2-methacryloylethanesulfonic acid, 2-(meth)acryloylpropanesulfonic acid, 2-(meth)acrylamide-2-methyl propane sulfonic acid, (meth)acrylamide, N-substituted (meth)acrylate, 2-hydroxyethyl (meth)acrylate, 2-hydroxypropyl (meth)acrylate, methoxypolyethylene glycol (meth)acrylate, polyethylene glycol (meth)acrylate, (N,N)-dimethylaminoethyl (meth)acrylate, (N, N)-dimethylam inopropyl (meth)acrylamide, or the like may be used as the monomer.

Herein, the water-soluble ethylene-based unsaturated monomer may have acidic groups, and at least some of the acidic groups may be neutralized by a neutralizing agent. Specifically, in the step of mixing the water-soluble ethylene-based unsaturated monomer having acidic groups, the cross-linking agent, the polymerization initiator and the neutralizing agent, at least some of the acidic groups of the water-soluble ethylene-based unsaturated monomer may be neutralized. In this case, a basic substance such as sodium hydroxide, potassium hydroxide, and ammonium hydroxide capable of neutralizing acidic groups may be used as the neutralizing agent.

In addition, a degree of neutralization of the water-soluble ethylene-based unsaturated monomer may be 50 to 90 mol %, 60 to 85 mol %, 65 to 85 mol %, or 65 to 70 mol %, wherein the degree of neutralization refers to the degree to which the acidic groups contained in the water-soluble ethylene-based unsaturated monomer are neutralized by the neutralizing agent. A range of the degree of neutralization may vary depending on the final physical properties. An excessively high degree of neutralization causes the neutralized monomers to be precipitated, and thus polymerization may not readily occur. On the contrary, an excessively low degree of neutralization not only deteriorates absorbency of the polymer, but also gives the polymer hard-to-handle properties, such as those of an elastic rubber.

In addition, the terminology 'cross-linking agent' used herein is different from an additional cross-linking agent for mainly cross-linking the surface of super absorbent polymer particles to be described later, and the cross-linking agent polymerizes unsaturated bonds of the water-soluble ethylene-based unsaturated monomers by cross-linking. The cross-linking in the above step proceeds regardless of the surface or the inside, but when the additional cross-linking process of the super absorbent polymer particles to be described later is in progress, the surface of the particles of the finally prepared super absorbent polymer mainly has a structure cross-linked by the additional cross-linking agent, and the inside of the particles mainly has a structure cross-linked by the cross-linking agent. Therefore, since the additional cross-linking agent mainly serves to cross-link the surface of the super absorbent polymer, it can be seen that it functions as a surface cross-linking agent, and the above cross-linking agent is distinguished from the second cross-linking agent and functions as an internal cross-linking agent.

As the cross-linking agent, any compound may be used as long as it allows the introduction of cross-linking bonds during polymerization of the water-soluble ethylene-based unsaturated monomer. As a non-limiting example, the cross-linking agent may be a multifunctional cross-linking agent such as N,N'-methylenebisacrylamide, trimethylolpropane tri(meth)acrylate, ethylene glycol di(meth)acrylate, polyethylene glycol (meth)acrylate, polyethylene glycol di(meth) acrylate, propylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth) acrylate, tripropylene glycol di(meth)acrylate, tetraethylene glycol di(meth)acrylate, dipentaerythritol pentaacrylate, glycerin tri(meth)acrylate, pentaerythritol tetraacrylate, triarylamine, ethylene glycol diglycidyl ether, propylene glycol, glycerin, or ethylene carbonate, and these may be used alone or in combination of two or more. However, the present disclosure is not limited thereto. Preferably, polyethylene glycol di(meth)acrylate may be used.

The cross-linking polymerization of the water-soluble ethylene-based unsaturated monomer in the presence of the cross-linking agent may be performed by thermal polymerization, photopolymerization or hybrid polymerization in the presence of a polymerization initiator with or without a thickener, a plasticizer, a preservation stabilizer, an antioxidant, etc., but the specific details will be described later.

In addition, the super absorbent polymer includes hydrophobic particles. In general, "hydrophobicity" is a concept distinct from hydrophilicity, and refers to a property that is not easily combined with water molecules. Specifically, when the water contact angle is 70° or more, it can be considered as hydrophobic. In addition, as used herein, the term "hydrophobic particles" refers to water-insoluble particles exhibiting hydrophobicity and having a solubility in water of less than 1 mg/L at 20° C./1 atm, or not soluble in water. If the hydrophobic particles are water-soluble particles, it is difficult to provide a gap between the particles while maintaining the particle shape when mixed with the pulverized hydrogel polymer particles containing water. Accordingly, agglomeration between the pulverized hydrogel particles cannot be effectively prevented, and thus it is not suitable to include the hydrophobic particles in the super absorbent polymer.

Accordingly, the hydrophobic particles have a water contact angle of 70° or more. More specifically, the hydrophobic particles may have a water contact angle of 80° or more, 90° or more, 94° or more, 100° or more, 105° or more, 117° or more, 120° or more, or 125° or more, and 175° or less, or 128° or less.

The hydrophobic particles are included in the super absorbent polymer, and more specifically, the hydrophobic particles are dry-mixed with the hydrogel polymer pulverized before the drying process. That is, the hydrophobic particles may be mixed with the hydrogel polymer in the form of solid particles, thereby suppressing re-agglomeration between the pulverized particles during drying and increasing drying efficiency.

In particular, the hydrophobic particles have a particle shape and are physically adsorbed to the hydrogel to provide a gap (physical distance) between the particles, thereby preventing fusion or agglomeration between the hydrogels and improving moisture blocking. More specifically, the hydrophobic particles may be denatured during a high-temperature drying process in which the super absorbent polymer contains a liquid material exhibiting hydrophobicity, so that the finally prepared polymer particles may be discolored. In addition, since a physical gap between the hydrogel particles cannot be maintained, and the effect of preventing agglomeration is not sufficient, so that a super absorbent polymer having a high proportion of large powder can be prepared, which is not preferable.

At least some of the hydrophobic particles may be present on a surface of the super absorbent polymer particles. Herein, "at least some of the hydrophobic particles are present on a surface of the super absorbent polymer particles" means that at least some of the hydrophobic particles are adsorbed on the surface of the super absorbent polymer particles. Specifically, the hydrophobic particles may be physically adsorbed on the surface of the super absorbent polymer particles by Van der Waals force. In addition, the presence of some of the hydrophobic particles on the surface of the super absorbent polymer particles can be confirmed through an SEM image of the surface of the super absorbent polymer particles prepared in Examples to be described later.

As the hydrophobic particles, any material exhibiting hydrophobicity and water-insolubility may be used without limitation, but those that function as reducing agents or neutralizing agents of the super absorbent polymer are excluded. More specifically, as the hydrophobic particles, organic-inorganic composite particles or inorganic particles exhibiting water-insolubility may be used. For example, organic-inorganic composite particles such as hydrophobic silicone resin, or inorganic particles such as natural inorganic particles and synthetic inorganic particles exhibiting water-insolubility excluding metal fine particles can be used. Specifically, examples of the hydrophobic particles include a hydrophobic silicone resin; silica such as hydrophobically surface-modified silica, finely divided silica, hydrous silica, diatomaceous earth and colloidal silica; hydrophobic clay such as kaolin, sericite, pyrophyllite, montmorillonite, bentonite and acid clay; carbonates such as precipitated (active, dry, ground or precipitated) calcium carbonate, and magnesium carbonate; silicates such as finely divided magnesium silicate, talc, soapstone, stearate, calcium silicate, magnesium aluminosilicate, and sodium aluminosilicate; carbon blacks such as channel black, furnace black, thermal black and acetylene black; alumina such as aluminum oxide, aluminum hydroxide and alumina white; barium sulfates such as natural barium sulfate, precipitated barium sulfate and lithopone; zirconia (zirconium oxide); satin white; aluminum sulfate; anhydrite; hemihydrate gypsum; chalk; whiting; choke; white lead; mica powder; zinc oxide; titanium oxide; magnesium oxide; active calcium fluoride; zeolite; calcium sulfite; molybdenum disulfide; asbestos; glass fiber; rock fiber; and the like. These can be used in combination of two or more thereof.

At this time, when particles exhibiting hydrophilicity such as untreated dry/wet silica, phyllosilicate, hydrotalcite, and sepiolite are used instead of the hydrophobic particles, agglomeration between the pulverized polymer particles during the drying process of the hydrogel polymer cannot be sufficiently prevented. Accordingly, 50 wt % or more of large powder having a particle diameter of greater than 850 μm may be included based on a total weight of the super absorbent polymer.

More specifically, the hydrophobic particles may be at least one selected from the group consisting of hydrophobic silicone resin particles, hydrophobic silica particles, and hydrophobic clay particles.

Specifically, the hydrophobic silicone resin may be polyorganosilsesquioxane. Herein, polyorganosilsesquioxane refers to a silsesquioxane resin in which at least one of Si atoms included has an organic group, wherein the organic group may be an alkyl group or an aryl group that may exhibit hydrophobicity. In this case, the alkyl group refers to a linear or branched alkyl group having 1 to 10 carbon atoms, and the aryl group refers to an aryl group having 6 to 20 carbon atoms and exhibiting aromaticity. That is, the organic group included in the polyorganosilsesquioxane can effectively prevent the pulverized hydrogel polymer from being fused or agglomerated again during drying in the preparation of the super absorbent polymer.

More specifically, the polyorganosilsesquioxane may be polyalkylsilsesquioxane, that is, an alkylsilsesquioxane resin.

For example, the hydrophobic silicone resin particles may be polymethylsilsesquioxane, that is, methylsilsesquioxane resin particles. As these methylsilquesquioxane resin particles, commercially available Tospearl® 120, Tospearl® 130, Tospearl® 145, Tospearl® 150, Tospearl® 240, Tospearl® 2000B, or Tospearl® 3120 manufactured by Momentive may be used.

In addition, the hydrophobic silicone resin particles may be spherical particles having an average particle diameter of about 0.1 μm to about 20 μm. When the average particle diameter of the hydrophobic silicone resin particles is too small, there may be a decrease in absorbency due to dense adsorption. When the average particle diameter of the hydrophobic silicone resin particles is excessively large, the adsorption efficiency to the hydrogel super absorbent polymer particles may decrease, thereby reducing drying efficiency. More specifically, the average particle diameter (μm) of the hydrophobic silicone resin particles may be 0.1 or more, 0.5 or more, 1 or more, 1.5 or more, or 2 or more, and 20 or less, 15 or less, 12 or less, 10 or less, or 5 or less.

At this time, the average particle diameter of the hydrophobic silicone resin particles was measured as a volume average diameter using Multisizer II manufactured by Coulter Counter, wherein the volume average diameter is the sum of squares of diameters of the spherical particles having the same weight and density as each particle weight divided by the total particle weight.

In addition, the hydrophobic silica is fumed silica surface-modified by a surface treatment agent, and the surface treatment agent may be selected from the group consisting of dimethyldichlorosilane (DDS), polydimethylsiloxane (PDMS) and hexamethyldisilazane (HMDS). That is, the surface-modified fumed silica may exhibit hydrophobicity by introducing an organic group such as a methyl group to the silanol (—SiOH) group on the surface. Accordingly, it is possible to effectively prevent the pulverized hydrogel polymer from being fused or agglomerated again during drying In addition, a specific surface area of the hydrophobic silica measured by the BET method may be 100 to 300 m²/g, and an average particle diameter of primary particles may be 5 nm to 50 nm. Herein, the primary particles refer to particles that do not agglomerate with each other, and are distinguished from aggregates/agglomerates.

In addition, the hydrophobic clay may be at least one selected from the group consisting of kaolin, sericite, pyrophyllite, montmorillonite, bentonite and acid clay (Fuller's Earth). Herein, the clay means soft soil with an average particle diameter of 5 μm or less.

In particular, kaolin is a 1:1 type clay mineral made of a tetrahedral silica sheet and an octahedral alumina sheet in a 1:1 ratio, and is expressed as the chemical formula of $Si_2Al_2O_5(OH)_4$, exhibiting water-insolubility. In addition, the kaolin is naturally derived clay having a specific surface area of 10 to 30 m²/g measured by the BET method. Further, since it is structurally hydrophobic and insoluble in water among various minerals, it is preferable to be included in the super absorbent polymer.

In addition, the hydrophobic particles may be included in an amount of about 0.1 to about 10 wt % based on the total weight of the super absorbent polymer. This may be implemented by using the hydrophobic particles in an amount of about 0.1 to about 10 parts by weight based on 100 parts by weight of the hydrogel polymer.

In addition, the super absorbent polymer includes the carboxylic acid-based additive. As described above, the carboxylic acid-based additive is mixed with the hydrogel polymer so that the hydrogel polymer is easily pulverized without agglomeration. At this time, the carboxylic acid-based additive is at least one selected from the group consisting of a carboxylic acid represented by the Chemical Formula 1 and a metal salt thereof. Specifically, the carboxylic acid-based additive is at least one selected from the group consisting of a carboxylic acid represented by the Chemical Formula 1, an alkali metal salt of a carboxylic acid represented by the Chemical Formula 1, and an alkaline earth metal salt of a carboxylic acid represented by the Chemical Formula 1. More specifically, the carboxylic acid-based additive is one of a carboxylic acid represented by the Chemical Formula 1, an alkali metal salt of a carboxylic acid represented by the Chemical Formula 1, and an alkaline earth metal salt of a carboxylic acid represented by the Chemical Formula 1.

In the Chemical Formula 1, A is a hydrophobic moiety and may be a linear or branched alkyl group having 5 to 21 carbon atoms. However, the case where A is a linear alkyl group is more advantageous in terms of suppressing agglomeration of pulverized particles and improving dispersibility. When A is an alkyl group having less than 5 carbon atoms, there is a problem in that the chain is short, so that the agglomeration of pulverized particles cannot be effectively controlled. When A is an alkyl group having more than 21 carbon atoms, mobility of the carboxylic acid-based additive may be reduced, so that the carboxylic acid-based additive may not be effectively mixed with the hydrogel polymer and the cost of the composition may increase due to an increase in the cost of the additive.

Specifically, in the Chemical Formula 1, A may be linear alkyl having 5 to 21 carbon atoms such as n-pentyl, n-hexyl, n-heptyl, n-octyl, n-nonyl, n-decanyl, n-undecanyl, n-dodecanyl, n-tridecanyl, n-tetradecanyl, n-pentadecanyl, n-hexadecanyl, n-heptadecanyl, n-octadecanyl, n-nonadecanyl, n-icosanyl, or n-heneicosanyl.

More specifically, A may be linear alkyl having 6 to 18 carbon atoms. For example, A may be $-C_6H_{13}$, $-C_{11}H_{23}$, $-C_{12}H_{25}$, $-C_{17}H_{35}$, or $-C_{18}H_{37}$.

In addition, the ethylene oxide (EO) linking group and the part $(B_1-B_2)$ of the Chemical Formula 1 improves adsorption performance with respect to the polymer surface, which may be insufficient only with the part C. When the number of carbon atoms of $B_2$ is more than 5, the distance between part $B_1$ and part C increases, and the adsorption performance with respect to the hydrogel polymer may be deteriorated. In addition, when m is 0, it is difficult to expect improvement in adsorption performance with respect to the polymer surface, and when m is more than 8, hydrogen bonding between the hydrogel polymer and/or super absorbent polymer particles may be induced, so that agglomeration of the particles may not be suppressed.

Herein, $R_1$ and $R_2$ may each independently be linear or branched alkyl having 1 to 4 carbon atoms. More specifically, $R_1$ and $R_2$ may each independently be methyl, ethyl, propyl, isopropyl, butyl, isobutyl, sec-butyl, or tert-butyl. Since the carboxylic acid-based additive can be adsorbed on the super absorbent polymer particles, it is advantageous that the molecular structure of the additive is not bulky, and thus both $R_1$ and $R_2$ may be methyl.

In addition, n of the Chemical Formula 1 may be 1, 2, or 3. More specifically, n, which means the number of $(B_1-B_2)$, is preferably 1, considering that the part $(B_1-B_2)$ is for reinforcing adsorption performance with respect to part C and how long a molecular length is required in order for the carboxylic acid-based additive to be effectively adsorbed on the hydrogel polymer.

Specifically, in the Chemical Formula 1, $B_1$ may be

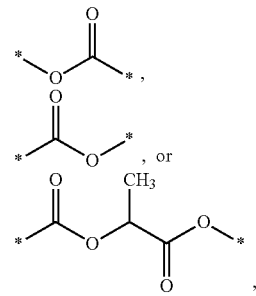

wherein * is a bonding site with a neighboring atom.

For example, $B_1$ may be

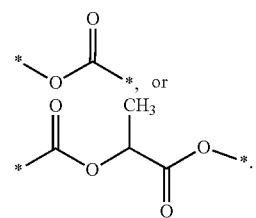

In addition, in the Chemical Formula 1, $B_2$ may be

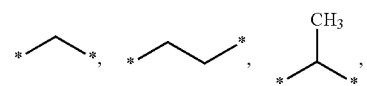

-continued

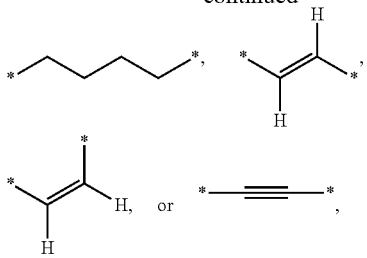

wherein * is a bonding site with a neighboring atom. At this time, in order to improve adsorption performance of the additive with respect to the cross-linked polymer together with part C, $B_2$ is preferably

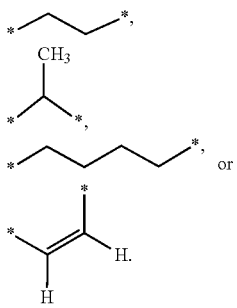

In addition, in the Chemical Formula 1, part C is a carboxyl group (COON) as a hydrophilic moiety, and when the carboxylic acid-based additive is a salt, it is a carboxylate group (COO$^-$).

In other words, the carboxylic acid-based additive may be a compound represented by the following Chemical Formula 1a:

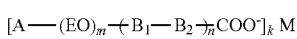

[Chemical Formula 1a]

in Chemical Formula 1a,

M is H$^+$, a monovalent cation of an alkali metal, or a divalent cation of an alkaline earth metal, k is 1 if M is H$^+$ or a monovalent cation of an alkali metal, and 2 if it is a divalent cation of an alkaline earth metal, and descriptions of A, EO, m, $B_1$, $B_2$ and n are as defined in the Chemical Formula 1.

More specifically, when the carboxylic acid-based additive is an alkali metal salt of the carboxylic acid represented by the Chemical Formula 1, the additive may be represented by the following Chemical Formula 1':

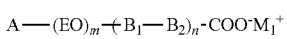

[Chemical Formula 1']

in Chemical Formula 1', $M_1$ is an alkali metal such as sodium or potassium, and descriptions of A, EO, m, $B_1$, $B_2$ and n are as defined in the Chemical Formula 1.

In addition, when the carboxylic acid-based additive is an alkaline earth metal salt of the carboxylic acid represented by the Chemical Formula 1, the additive may be represented by the following Chemical Formula 1":

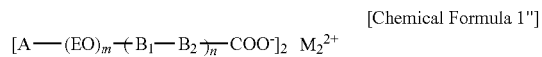

[Chemical Formula 1"]

in Chemical Formula 1", $M_2$ is an alkaline earth metal such as calcium, and descriptions of A, EO, m, $B_1$, $B_2$ and n are as defined in the Chemical Formula 1.

For example, when m is 0 in the Chemical Formula 1, the carboxylic acid-based additive may be any one carboxylic acid selected from the group consisting of:

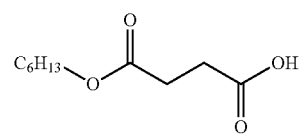
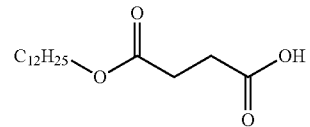
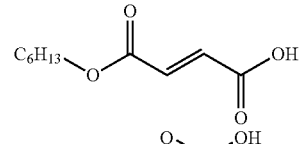
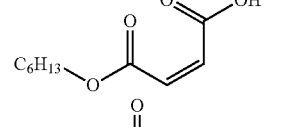
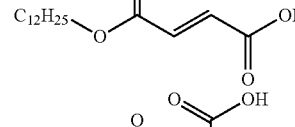
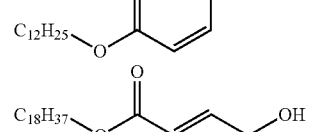
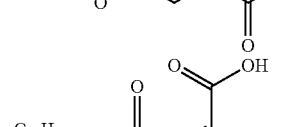
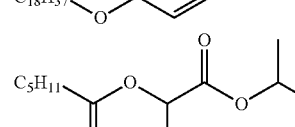
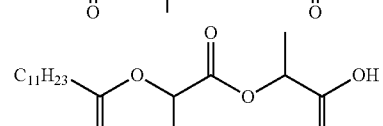
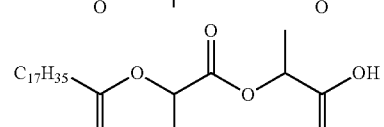

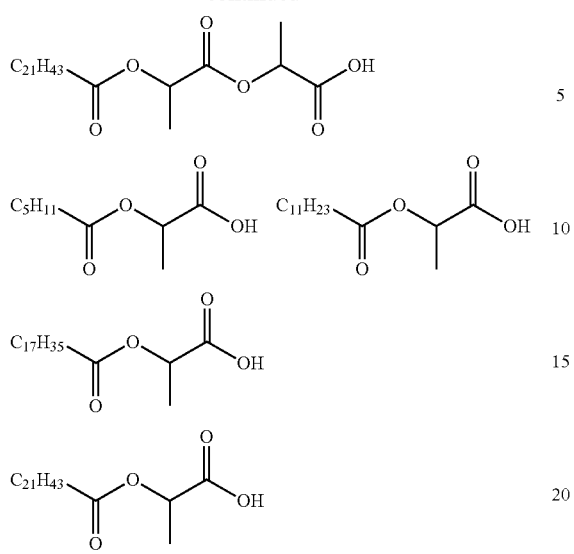

In addition, when m is not 0 in the Chemical Formula 1, the carboxylic acid-based additive may be carboxylic acid represented by the following Chemical Formula 1A-1:

[Chemical Formula 1A-1]

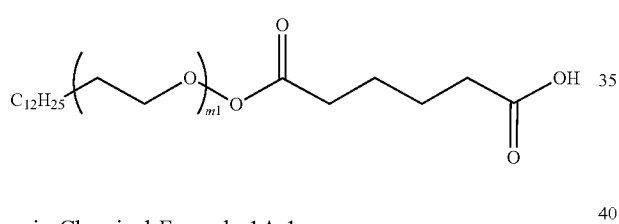

in Chemical Formula 1A-1, m1 is 3, 4, 5, 6, 7, or 8.

Alternatively, when m is 0 in the Chemical Formula 1, the carboxylic acid-based additive may be any one alkali metal salt selected from the group consisting of:

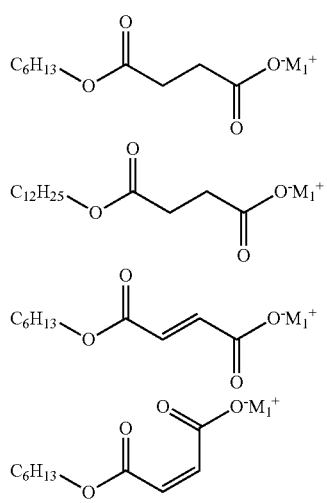

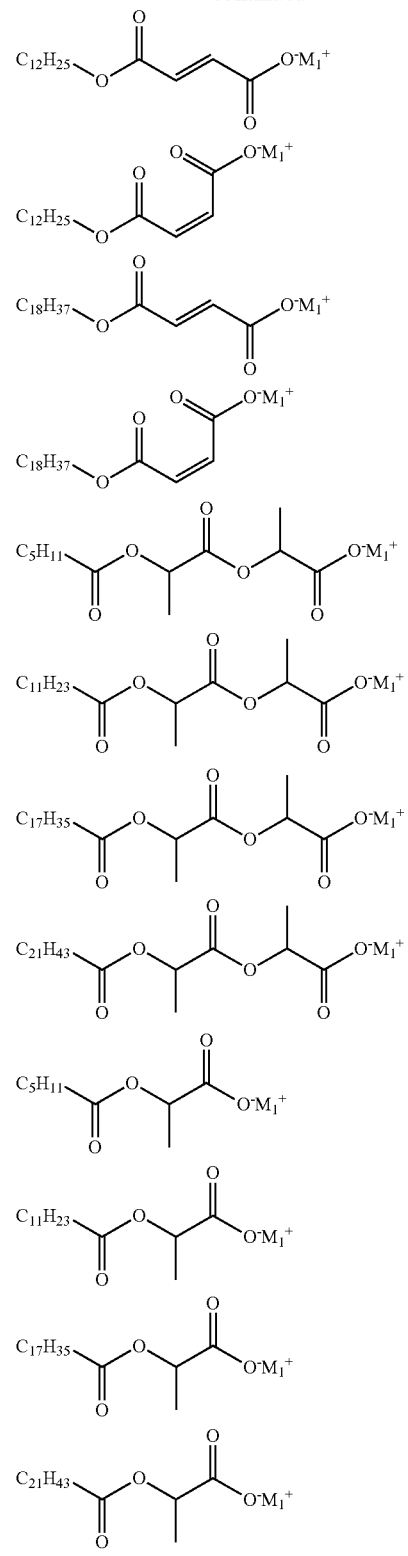

In the above, each $M_1$ is independently an alkali metal.

In addition, when m is not 0 in the Chemical Formula 1, the carboxylic acid-based additive may be an alkali metal salt represented by the following Chemical Formula 1B-1:

[Chemical Formula 1B-1]

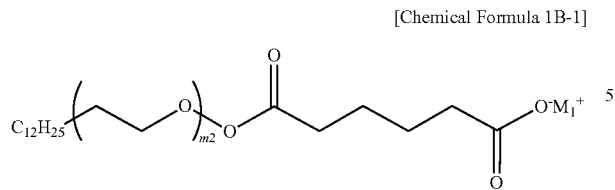

in Chemical Formula 1B-1,
m2 is 3, 4, 5, 6, 7, or 8, and
$M_1$ is an alkali metal.

Alternatively, when m is 0 in the Chemical Formula 1, the carboxylic acid-based additive may be any one alkaline earth metal salt selected from the group consisting of:

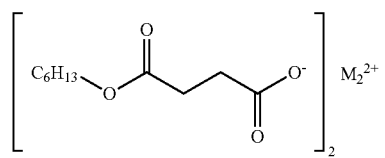

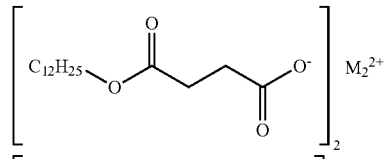

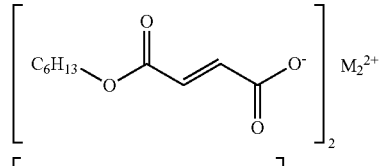

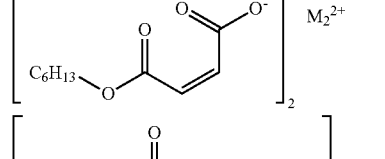

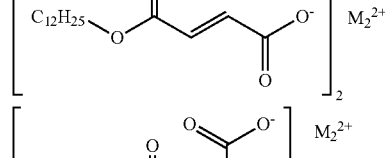

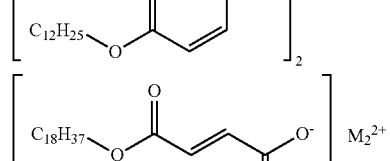

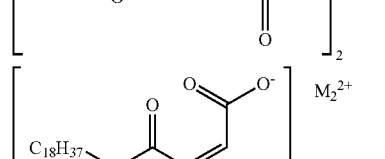

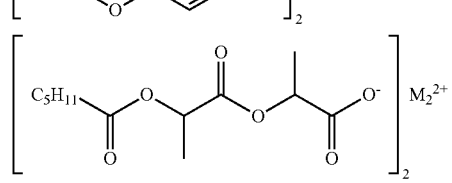

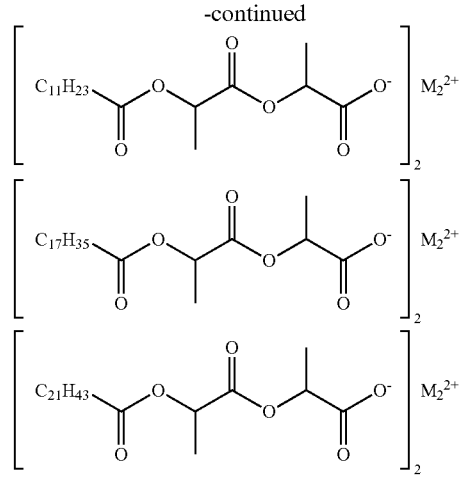

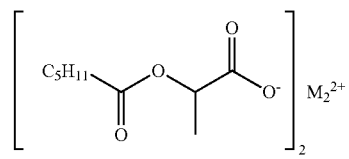

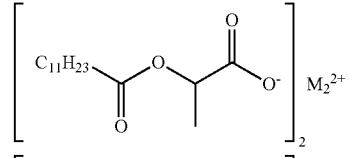

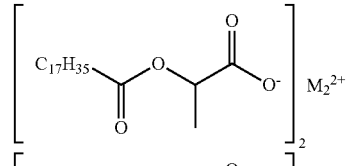

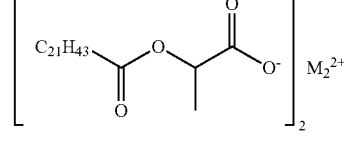

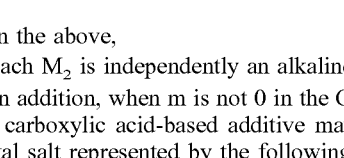

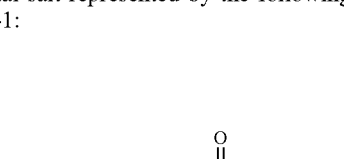

in the above,
each $M_2$ is independently an alkaline earth metal.

In addition, when m is not 0 in the Chemical Formula 1, the carboxylic acid-based additive may be an alkali earth metal salt represented by the following Chemical Formula 1C-1:

[Chemical Formula 1C-1]

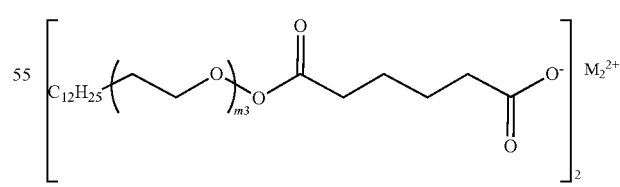

in Chemical Formula 1C-1,
m3 is 3, 4, 5, 6, 7, or 8, and
$M_2$ is an alkaline earth metal.

For example, the carboxylic acid-based additive may be any one of compounds represented by the following Chemical Formulae 1-1 to 1-9, but is not limited thereto:

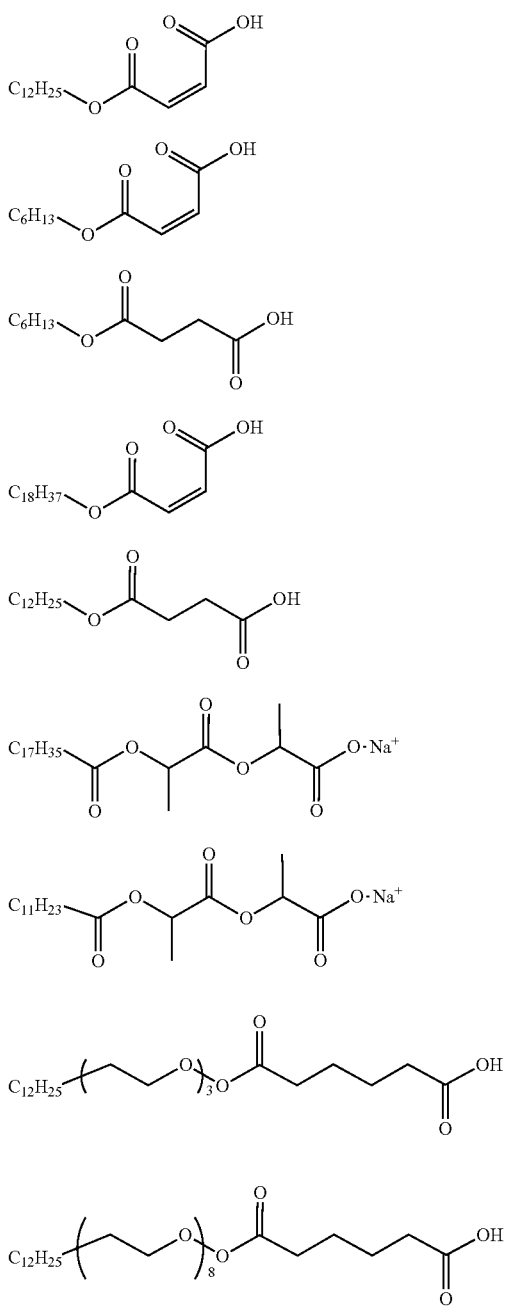

In addition, the super absorbent polymer may further include a compound formed by decomposing an ester bond of $B_1$ in the process of drying after the carboxylic acid-based additive is pulverized with the hydrogel polymer, in addition to the carboxylic acid-based additive.

Specifically, when the additive is a compound in which n is 1 and $B_1$ is —OCO—, the super absorbent polymer composition may further include an alcohol having an A-(EO)m-OH structure and a compound having a HOOC¿$B_2$—C structure.

In addition, when the additive is a compound in which n is 1 and $B_1$ is —COO—, the super absorbent polymer composition may further include a carboxylic acid having an A-(EO)m-COON structure and a compound having a HO—$B_2$—C structure.

In addition, when the additive is a compound in which n is 1 and $B_1$ is —COOCH(CH$_3$)COO—, the super absorbent polymer composition may further include a carboxylic acid having an A-(EO)m-COON structure and a compound having a HOCH(CH$_3$)COO—$B_2$—C structure.

As the super absorbent polymer composition further includes the compound formed by decomposing an ester bond in the additive molecule, mobility of the additives is increased, and a phenomenon of re-agglomeration after pulverization can be further prevented.

Herein, the carboxylic acid-based additive may be included in an amount of 0.01 to 10 wt % based on the total weight of the super absorbent polymer composition. When the content of the carboxylic acid-based additive in the composition is too low, the effect of controlling agglomeration by the additive is small, and thus super absorbent polymer particles not pulverized to a desired particle diameter may be included. When the content of the carboxylic acid-based additive is too high, water retention capacity and absorbency under pressure, which are general physical properties of the super absorbent polymer, may be deteriorated. This may be implemented by using about 0.01 to about 10 parts by weight of the carboxylic acid-based additive based on 100 parts by weight of the hydrogel polymer. However, since the ester bond of $B_1$ may be decomposed during the pulverization and drying processes after the hydrogel polymer is formed, the amount of the added additive and the amount of the additive remaining in the final super absorbent polymer composition may not be the same.

The content of the additive in the super absorbent polymer composition may be measured by analyzing the content of the additive dissolved in the solution part after adding 1 g of the super absorbent polymer composition to 1 ml of distilled water, sufficiently mixing for 1 hour until swelling, and then filtering to extract only the solution part, followed by HPLC analysis.

For example, the carboxylic acid-based additive may be included in an amount of 0.01 wt % or more, 0.02 wt % or more, 0.05 wt % or more, 0.1 wt % or more, 0.2 wt % or more, 0.31 wt % or more, or 0.4 wt % or more, and 10 wt % or less, 8 wt % or less, 5 wt % or less, 3 wt % or less, 1 wt % or less, or 0.5 wt % or less based on the total weight of the super absorbent polymer.

Meanwhile, at least some of the carboxylic acid-based additive may be present on a surface of the super absorbent polymer particles. Herein, "at least some of the carboxylic acid-based additive is present on a surface of the super absorbent polymer particles" means that at least some of the carboxylic acid-based additive is adsorbed or bonded on the surface of the super absorbent polymer particles. Specifically, the carboxylic acid-based additive may be physically or chemically adsorbed on the surface of the super absorbent polymer. More specifically, the hydrophilic functional group of the carboxylic acid-based additive may be physically adsorbed on the hydrophilic moiety of the surface of the super absorbent polymer by an intermolecular force such as dipole-dipole interaction. In this way, the hydrophilic moiety of the carboxylic acid-based additive is physically adsorbed on the surface of the super absorbent polymer particles to surround the surface, and the hydrophobic moiety of the additive is not adsorbed on the surface of the polymer particles, so the polymer particles may be coated with the additive in the form of a micelle structure.

Therefore, when at least some of the carboxylic acid-based additive is present on a surface of the super absorbent polymer particles, agglomeration between pulverized particles in the preparation of the super absorbent polymer may be more effectively suppressed, compared to the case where all of the carboxylic acid-based additive is present inside the super absorbent polymer particles, specifically, inside the cross-linked polymer.

In addition, as at least some of the carboxylic acid-based additive is present on a surface of the super absorbent polymer particles, the super absorbent polymer including the carboxylic acid-based additive may have similar or higher surface tension with higher bulk density compared to a composition not including the additive.

Meanwhile, when the super absorbent polymer does not further include an additional cross-linked layer to be described later, other hydrophilic additives other than the plurality of super absorbent polymer particles, the carboxylic acid-based additive and a hydrolyzate of the carboxylic acid-based additive generated by hydrolysis of the carboxylic acid-based additive in the preparation of the super absorbent polymer may not be included.

Specifically, the super absorbent polymer of the embodiment may not include a compound having a glucose unit containing a plurality of hydroxyl groups in the molecule such as microcrystalline cellulose. For example, when the super absorbent polymer includes microcrystalline cellulose having an average particle diameter of 1 to 10 μm such as AVICEL® PH-101 represented by the following Chemical Formula 3 available from FMC, agglomeration between super absorbent polymer particles may not be suppressed due to the plurality of hydroxyl groups, and thus the effect by the above-described additive may not be effectively expressed.

[Chemical Formula 3]

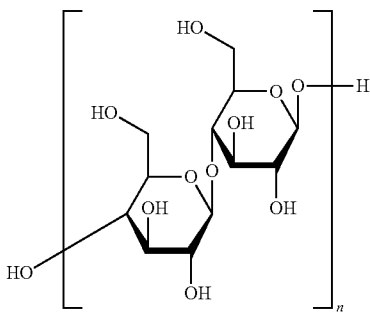

In addition, the super absorbent polymer of the embodiment may not include a hydrophilic additive such as polyethylene glycol, polypropylene glycol, poly(ethylene glycol)-poly(propylene glycol) copolymer, polyoxyethylene lauryl ether carboxylic acid, sodium polyoxyethylene lauryl ether carboxylate, lauryl sulfate, sodium lauryl sulfate, and the like. Since such additives do not have the part ($B_1$-$B_2$) of Chemical Formula 1 in the molecule, they are not sufficiently adsorbed on the surface of the cross-linked polymer, so that agglomeration between super absorbent polymer particles is not effectively suppressed. Accordingly, when the super absorbent polymer includes the hydrophilic additive as described above instead of the carboxylic acid-based additive, agglomeration between particles after pulverization of the cross-linked polymer is not suppressed, so that the super absorbent polymer contains a large amount of fine powder and exhibits low water retention capacity and low bulk density.

Meanwhile, the super absorbent polymer may further include a cross-linked layer formed by further cross-linking the cross-linked polymer using an additional cross-linking agent on at least a part of the surface of the super absorbent polymer particles. Herein, the cross-linked layer is mainly formed on at least a part of the surface of each super absorbent polymer particle, and has a structure in which the cross-linked polymer in the super absorbent polymer is cross-linked by an additional cross-linking agent. This is to increase the surface cross-linking density of the super absorbent polymer particles. When the super absorbent polymer particles further include a structure in which at least some of the super absorbent polymer particles are cross-linked by the additional cross-linking agent, they may have a structure having higher cross-linking density on the outside than inside.

As the additional cross-linking agent, any additional cross-linking agent that has been conventionally used in the preparation of a super absorbent polymer may be used without any particular limitation. Examples of the additional cross-linking agent may include at least one polyol selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol and glycerol; at least one carbonate-based compound selected from the group consisting of ethylene carbonate, propylene carbonate, and glycerol carbonate; an epoxy compound such as ethylene glycol diglycidyl ether; an oxazoline compound such as oxazolidinone; a polyamine compound; an oxazoline compound; a mono-, di- or poly-oxazolidinone compound; a cyclic urea compound; and the like. Specifically, as the additional cross-linking agent, one or more, two or more, or three or more of the aforementioned additional cross-linking agents may be used. For example, ethylene carbonate-propylene carbonate (ECPC), propylene glycol and/or glycerol carbonate may be used.

In addition, the super absorbent polymer may have centrifuge retention capacity (CRC) of 35 g/g or more, 36 g/g or more, 37.5 g/g or more, 38 g/g or more, 38.2 g/g or more, 39.1 g/g or more, 39.2 g/g or more, or 39.3 g/g or more, and 45 g/g or less, 43 g/g or less, 42 g/g or less, or 40.8 g/g or less, when measured in accordance with the EDANA WSP 241.3. In addition, the super absorbent polymer may have absorbency under pressure (AUP) at 0.7 psi of 15 g/g or more, 18 g/g or more, 20.9 g/g or more, 21 g/g or more, 21.1 g/g or more, 22.0 g/g or more, or 22.4 g/g or more, and 28 g/g or less, 26 g/g or less, 25 g/g or less, or 24.8 g/g or less, when measured in accordance with the EDANA WSP 242.3.

Preparation Method of Super Absorbent Polymer

Meanwhile, according to another embodiment, there is provided a preparation method of a super absorbent polymer including the following steps:

a first step of forming a hydrogel polymer by cross-linking polymerization of a water-soluble ethylene-based unsaturated monomer having at least partially neutralized acidic groups in the presence of a cross-linking agent and a polymerization initiator;

a second step of mixing the hydrogel polymer with a carboxylic acid-based additive, followed by pulverization;

a third step of mixing the pulverized product prepared in the second step with hydrophobic particles; and a fourth step of drying the mixture prepared in the third step.

Herein, the carboxylic acid-based additive is at least one selected from the group consisting of a carboxylic acid represented by the following Chemical Formula 1 and a salt thereof.

Hereinafter, the preparation method of a super absorbent polymer of one embodiment will be described in more detail for each step.

In the preparation method of a super absorbent polymer of one embodiment, a first step of forming a hydrogel polymer by cross-linking polymerization of a water-soluble ethylene-based unsaturated monomer having at least partially neutralized acidic groups in the presence of a cross-linking agent and a polymerization initiator is first performed.

This step may consist of a step of preparing a monomer composition by mixing the water-soluble ethylene-based unsaturated monomer, a cross-linking agent, and a polymerization initiator, and a step of forming a hydrogel polymer by thermal polymerization or photopolymerization of the monomer composition. For details on the water-soluble ethylene-based unsaturated monomer and the cross-linking agent, refer to the above.

In the monomer composition, the cross-linking agent may be used in an amount of 0.01 to 5 parts by weight based on 100 parts by weight of the water-soluble ethylene-based unsaturated monomer. For example, the cross-linking agent may be used in an amount of 0.01 parts by weight or more, 0.05 parts by weight or more, 0.1 parts by weight or more, 0.16 parts by weight or more, or 0.45 parts by weight or more, and 5 parts by weight or less, 3 parts by weight or less, 2 parts by weight or less, 1 parts by weight or less, or 0.7 parts by weight or less based on 100 parts by weight of the water-soluble ethylene-based unsaturated monomer. When too little cross-linking agent is used, cross-linking does not occur sufficiently, and thus it may be difficult to achieve strength above an appropriate level, and when too much cross-linking agent is used, the internal cross-linking density increases, and thus it may be difficult to achieve a desired level of water retention capacity.

In addition, the polymerization initiator may be properly selected depending on the polymerization method. In the case of a thermal polymerization, a thermal polymerization initiator is used, and in the case of a photopolymerization, a photopolymerization initiator is used. Further, in the case of a hybrid polymerization method (a method using both heat and light), all of the thermal polymerization initiator and the photopolymerization initiator can be used. However, even by the photopolymerization method, a certain amount heat is generated by UV radiation and the like, and some heat occurs as the polymerization reaction, an exothermal reaction, progresses. Therefore, the composition may additionally include the thermal polymerization initiator.

Herein, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and a-aminoketone. Further, specific examples of the acyl phosphine include diphenyl(2,4,6-trimethylbenzoyl) phosphine oxide, phenylbis(2,4,6-trimethylbenzoyl)phosphine oxide, ethyl(2,4,6-trimethylbenzoyl)phenylphosphinate, and the like. More various photopolymerization initiators are well disclosed in "UV Coatings: Basics, Recent Developments and New Application (Elsevier, 2007)" written by Reinhold Schwalm, p 115, and the present disclosure is not limited thereto.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na2S2O_8$), potassium persulfate ($K25208$), ammonium persulfate (($NR_4)_2S_2O_8$), and the like may be used as examples of the persulfate-based initiators; and 2,2-azobis(2-am idinopropane) dihydrochloride, 2,2-azobis-(N, N-dimethylene)isobutyram idine dihydrochloride, 2-(carbamoylazo)isobutylonitril, 2,2-azobis[2-(2-imidazolin-2-yl)propane] dihydrochloride, 4,4-azobis-(4-cyanovaleric acid), and the like may be used as examples of the azo-based initiators. More various thermal polymerization initiators are well disclosed in 'Principle of Polymerization (Wiley, 1981)' written by Odian, p 203, and the present disclosure is not limited thereto.

The polymerization initiator may be used in an amount of 2 parts by weight or less based on 100 parts by weight of the water-soluble ethylene-based unsaturated monomer. For example, the polymerization initiator may be used in an amount of 0.01 parts by weight or more, 0.05 parts by weight or more, 0.1 parts by weight or more, 0.128 parts by weight or more, or 0.2 parts by weight or more, and 1 parts by weight or less, or 0.5 parts by weight or less based on 100 parts by weight of the water-soluble ethylene-based unsaturated monomer. When the concentration of the polymerization initiator is excessively low, the polymerization rate becomes slow, and a large amount of residual monomers may be extracted from the final product. Conversely, when the concentration of the polymerization initiator is higher than the above range, polymer chains forming a network are shortened, so that the content of extractable components increases and absorbency under pressure decreases, thereby lowering physical properties of the polymer.

The monomer composition may further include an additive such as a thickener, a plasticizer, a preservation stabilizer, an antioxidant, and the like, if necessary.

In addition, the monomer composition containing the monomer may be, for example, in the form of a solution dissolved in a solvent such as water. The solid content of the monomer composition in a solution state, that is, the concentration of the monomer, the cross-linking agent, and the polymerization initiator may be appropriately adjusted in consideration of the polymerization time and reaction conditions. For example, the solid content of the monomer composition may be 10 to 80 wt %, 15 to 60 wt %, or 30 to 50 wt %.

When the monomer composition has the solid content in the above range, it may be advantageous for controlling the pulverization efficiency during pulverization of the polymer to be described later while eliminating the need to remove unreacted monomers after polymerization by using a gel effect phenomenon occurring in the polymerization reaction of a high-concentration aqueous solution.

At this time, any solvent which can dissolve the above components may be used without limitation. For example, the solvent may be in combination of at least one selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, and N,N-dimethylacetamide.

Meanwhile, the cross-linking polymerization of a water-soluble ethylene-based unsaturated monomer having at least partially neutralized acidic groups may be performed without any particular limitation, as long as the hydrogel polymer can be formed by thermal polymerization, photopolymerization, or hybrid polymerization.

Specifically, the polymerization method is largely divided into thermal polymerization and photopolymerization depending on an energy source of the polymerization. In the case of thermal polymerization, it is generally carried out in a reactor equipped with an agitation spindle, such as a kneader. In the case of photopolymerization, it is generally carried out in a reactor equipped with a movable conveyor belt, or in a container with a flat bottom. However, the above-mentioned polymerization method is merely an example, and the present disclosure is not limited thereto.

For example, a hydrogel polymer may be obtained by supplying hot air to the reactor with an agitation spindle such as a kneader or heating the reactor to perform thermal polymerization. The hydrogel polymer thus obtained may have a size of several centimeters to several millimeters, according to the shape of the agitation spindle equipped in the reactor. Specifically, the size of the obtained hydrogel polymer may vary depending on the concentration and injection speed of the monomer composition injected thereto, and a hydrogel polymer having a weight average particle diameter of 2 to 50 mm may be obtained.

Further, when the photopolymerization is carried out in a reactor equipped with a movable conveyor belt or in a container with a flat bottom as described above, the obtained hydrogel polymer may be usually a sheet-like hydrogel polymer having a width of the belt. In this case, the thickness of the polymer sheet may vary depending on the concentration, injection speed or injection amount of the monomer composition to be injected, but usually, it is preferable to feed the monomer composition such that a sheet-like polymer having a thickness of about 0.5 to about 5 cm can be obtained. When the monomer mixture is fed such that the thickness of the sheet-like polymer becomes too thin, the production efficiency is low, which is undesirable. When the thickness of the sheet-like polymer is greater than 5 cm, the polymerization reaction cannot be evenly carried out over the entire thickness because of the excessive thickness.

At this time, the hydrogel polymer thus obtained may have a moisture content of 40 to 70 wt %. For example, the moisture content of the hydrogel polymer may be 40 wt % or more, 45 wt % or more, 50 wt % or more, or 55 wt % or more, and 70 wt % or less, 65 wt % or less, or 60 wt % or less. When the moisture content of the hydrogel polymer is too low, it is difficult to secure an appropriate surface area in the subsequent pulverizing step, and there is a concern that the drying efficiency may decrease. When the moisture content of the hydrogel polymer is too high, the pressure received in the subsequent pulverizing step increases, so that absorbency under pressure may decrease, and there is a concern that a lot of energy and a long time may be required in the drying step after pulverization.

Meanwhile, the "moisture content" in the present disclosure is the content of moisture in the entire weight of the hydrogel polymer, and it means a value of which the weight of the dried polymer is subtracted from the weight of the hydrogel polymer. Specifically, the moisture content is defined as a value calculated by the weight loss due to moisture evaporation from the polymer in the process of increasing the temperature of the crumb polymer for drying through infrared heating. At this time, the drying conditions for measuring the moisture content are as follows: the temperature is increased to about 180° C. and maintained at 180° C., and the total drying time is 40 min including 5 min of a heating step.

Subsequently, a second step of mixing the hydrogel polymer with the carboxylic acid-based additive, followed by pulverization is performed to prepare a pulverized product containing hydrous super absorbent polymer particles, which are pulverized hydrogel polymer particles, and the carboxylic acid-based additive. For details on the carboxylic acid-based additive, refer to the above.

In a conventional preparation method of a super absorbent polymer, the hydrogel polymer is coarsely pulverized, dried, and then pulverized to a desired particle diameter in a dried state to prepare a super absorbent polymer. In this case, a large amount of fine powder having a particle diameter of less than 150 μm may be generated due to pulverization in a dried state. Accordingly, there is a problem that a classification process for classifying the produced super absorbent polymer particles according to the particle diameter is necessarily required.

However, when the pulverization is performed with the additive having the structure of Chemical Formula 1 in the state of the hydrogel polymer as described above, it is possible to prepare a group of particles having a desired particle diameter without agglomeration of the pulverized particles. Accordingly, the preparation method of a super absorbent polymer according to one embodiment does not require a pulverizing process and a classification process after drying, thereby greatly reducing the manufacturing cost of the super absorbent polymer. In the above step, the carboxylic acid-based additive may be used in an amount of about 0.01 to about 10 parts by weight based on 100 parts by weight of the hydrogel polymer. When too little carboxylic acid-based additive is used, the particles may not be evenly adsorbed on the surface of the hydrogel polymer, resulting in re-agglomeration of the particles after pulverization, and when too much carboxylic acid-based additive is used, the overall physical properties of the final super absorbent polymer may decrease. More specifically, the carboxylic acid-based additive may be used in an amount of 0.01 parts by weight or more, 0.02 parts by weight or more, 0.05 parts by weight or more, 0.1 parts by weight or more, 0.2 parts by weight or more, or 0.4 parts by weight or more, and 10 parts by weight or less, 8 parts by weight or less, 5 parts by weight or less, 3 parts by weight or less, 1 parts by weight or less, or 0.5 parts by weight or less based on 100 parts by weight of the hydrogel polymer.

The method of mixing the additive with the hydrogel polymer is not particularly limited, and may be appropriately selected as long as it is a method capable of evenly mixing the additive with the hydrogel polymer.

For example, the carboxylic acid-based additive may be mixed in the form of a solution dissolved in a solvent, specifically in water. At this time, a method of putting the carboxylic acid-based additive in the form of a solution and the hydrogel polymer in a reaction tank for mixing, a method of spraying the solution after putting the hydrogel polymer in a mixer, a method of continuously supplying the hydrogel polymer and the solution to a continuously operating mixer for mixing, or the like may be used.

A pulverized product containing hydrous super absorbent polymer particles and the additive may be prepared by mixing the hydrogel polymer with the additive, followed by pulverization. Specifically, the pulverization step may be performed such that the pulverized hydrous super absorbent polymer particles have a particle diameter of 150 μm to 850 μm. Herein, the "hydrous super absorbent polymer particles"

are particles having a moisture content of about 40 wt % or more. Since they are particles in which the hydrogel polymer is pulverized into particles without a drying process, they may have a moisture content of 40 to 70 wt %, like the hydrogel polymer.

Herein, the pulverizing machine used for pulverization is not particularly limited. Specifically, it may include at least one selected from the group consisting of a vertical pulverizer, a turbo cutter, a turbo grinder, a rotary cutter mill, a cutter mill, a disc mill, a shred crusher, a crusher, a chopper, and a disc cutter, but the present disclosure is not limited thereto.

Alternatively, a pin mill, a hammer mill, a screw mill, a roll mill, a disc mill, or a jog mill may be also used as the pulverizing machine, but the present disclosure is not limited thereto.

Meanwhile, at least some of the additive contained in the pulverized product may be present on a surface of the hydrous super absorbent polymer particles. As describe above, "at least some of the carboxylic acid-based additive is present on a surface of the hydrous super absorbent polymer particles" means that at least some of the carboxylic acid-based additive is adsorbed or bonded on the surface of the hydrous super absorbent polymer particles. This is because the carboxylic acid-based additive is not added during the polymerization process of the water-soluble ethylene-based unsaturated monomer, but is added after the polymer is formed. Accordingly, the phenomenon of re-agglomeration between the hydrous super absorbent polymer particles may be suppressed, compared to the case where the carboxylic acid-based additive is added during the polymerization process and present inside the polymer.

Subsequently, a third step of mixing the pulverized product prepared in the second step with hydrophobic particles is performed. For details on the hydrophobic particles, refer to the above. The method of mixing the hydrophobic particles with the pulverized product is not particularly limited as long as the hydrophobic particles can be uniformly dispersed in the pulverized product, and may be appropriately selected and used.

For example, the hydrophobic particles may be mixed by a dry process rather than in the form of a solution dissolved in a solvent. Accordingly, the pulverized product and the hydrophobic particles may be mixed by putting them together in a mixer. When the hydrophobic particles are not soluble in the solvent, or when the hydrophobic particles are dissolved in the solvent and mixed with the pulverized product in a liquid phase, it is difficult to maintain the particle shape, so there is a problem in that the effect of controlling agglomeration between the pulverized hydrogel polymer particles cannot be achieved.

Herein, the hydrophobic particles may be used in an amount of 0.1 to 10 parts by weight based on 100 parts by weight of the hydrogel polymer. When too little hydrophobic particles are used, the adsorption efficiency to the hydrogel super absorbent polymer particles may decrease, resulting in a decrease in drying efficiency. When too much hydrophobic particles are used, there may be a decrease in absorbency due to dense adsorption. More specifically, the hydrophobic particles may be used in an amount of 0.1 parts by weight or more, 0.5 parts by weight or more, 0.8 parts by weight or more, or 1.0 parts by weight or more, and 10 parts by weight or less, 8 parts by weight or less, 5 parts by weight or less, 3 parts by weight or less, or 2 parts by weight or less based on 100 parts by weight of the hydrogel polymer.

Subsequently, a fourth step of preparing a super absorbent polymer by drying the mixture prepared in the third step is performed. Particularly, it is possible to prepare a super absorbent polymer containing super absorbent polymer particles having desired general physical properties even without an additional pulverizing step after drying of the pulverized product.

Drying of the pulverized product may be performed such that the moisture content of each of the plurality of super absorbent polymer particles contained in the prepared super absorbent polymer is about 10 wt % or less, specifically, about 0.1 to about 10 wt %.

At this time, the drying temperature may be about 60° C. to about 250° C. When the drying temperature is too low, the drying time may become excessively long, and when the drying temperature is too high, only the surface of the polymer is dried and the physical properties of the final super absorbent polymer may decrease. Therefore, the drying process may be preferably carried out at a temperature of about 100° C. to about 240° C., more preferably at a temperature of about 110° C. to about 220° C.

Furthermore, the drying time may be about 20 minutes to about 12 hours in consideration of process efficiency. For example, it may be dried for about 10 minutes to about 100 minutes, or about 20 minutes to about 60 minutes. The drying method in the drying step is not particularly limited if it has been generally used in the drying process. Specifically, the drying step may be carried out by the method of hot air provision, infrared radiation, microwave radiation, UV ray radiation, and the like.

The super absorbent polymer prepared as described above may contain less than about 10 wt %, more specifically less than about 5 wt % of fine powder having a particle diameter of less than 150 μm based on the total weight, in addition to the plurality of super absorbent polymer particles and the additive. This is in contrast to having fine powder of about 10 wt % to about 20 wt % when the hydrogel polymer is dried and then pulverized to prepare a super absorbent polymer.

The super absorbent polymer prepared in this way may contain less than 40 wt %, preferably less than 36 wt % of large powder having a particle diameter of greater than 850 μm based on a total weight. As can be seen in Examples and Comparative Examples to be described later, this is significantly lower than the case where the hydrophobic particles are not added, and it can be seen that the re-agglomeration between the particles is suppressed by the hydrophobic particles and an efficient drying process is performed. For example, the super absorbent polymer may contain 10 wt % or more, 17.4 wt % or more, 20 wt % or more, 20.1 wt % or more, 25 wt % or more, or 28.5 wt % or more and less than 36 wt %, 35.5 wt % or less, 31.3 wt % or less, or 28.8 wt % or less of large powder having a particle diameter of greater than 850 μm based on the total weight. The large powder content (proportion of large powder) can be calculated by the method of Equation 1:

Proportion of large powder (%)=[(content of particles exceeding 850 μm that did not pass through 20 mesh)/(total content of particles)]*100    [Equation 1]

Thereafter, if necessary, a step of forming an additional cross-linked layer on at least a part of the surface of the super absorbent polymer particles in the presence of an additional cross-linking agent may be further included. By the above step, the cross-linked polymer included in the super absorbent polymer particles may be further cross-linked with an additional cross-linking agent, so that an additional cross-linked layer may be formed on at least a part of the surface of the super absorbent polymer particles.

This additional cross-linking agent may be used in an amount of about 0.001 to about 5 parts by weight based on 100 parts by weight of the super absorbent polymer particles. For example, the additional cross-linking agent may be used in an amount of 0.005 parts by weight or more, 0.01 parts by weight or more, or 0.05 parts by weight or more, and 5 parts by weight or less, 4 parts by weight or less, or 3 parts by weight or less based on 100 parts by weight of the super absorbent polymer particles. By adjusting the content of the additional cross-linking agent within the above-described range, a super absorbent polymer having excellent absorption properties can be prepared.

In addition, the step of forming the additional cross-linked layer may be performed by adding an inorganic material in addition to the additional cross-linking agent. That is, in the presence of the additional cross-linking agent and the inorganic material, the step of forming an additional cross-linked layer by further cross-linking the surface of the super absorbent polymer particles may be performed.

As the inorganic material, at least one inorganic material selected from the group consisting of silica, clay, alumina, silica-alumina composite, titania, zinc oxide and aluminum sulfate may be used. The inorganic material may be used in a powdery form or in a liquid form, and in particular, alumina powder, silica-alumina powder, titania powder, or nanosilica solution may be used. In addition, the inorganic material may be used in an amount of about 0.001 to about 1 parts by weight based on 100 parts by weight of the super absorbent polymer particles. In addition, the method of mixing the additional cross-linking agent with the super absorbent polymer is not particularly limited. For example, a method of adding the additional cross-linking agent and the super absorbent polymer in a reactor for mixing, a method of spraying the additional cross-linking agent onto the super absorbent polymer, or a method of mixing the super absorbent polymer and the additional cross-linking agent while continuously providing them to a continuously operating mixer may be used.

When mixing the additional cross-linking agent and the super absorbent polymer, water and methanol may be further mixed therewith. When water and methanol are added thereto, there is an advantage that the additional cross-linking agent may be evenly dispersed in the super absorbent polymer. At this time, amounts of water and methanol to be added may be properly controlled for the purposes of inducing a uniform dispersion of the additional cross-linking agent, preventing an agglomeration phenomenon of the super absorbent polymer, and optimizing a surface penetration depth of the cross-linking agent. The additional cross-linking process may be performed at a temperature of about 80° C. to about 250° C. More specifically, the additional cross-linking process may be performed at a temperature of about 100° C. to about 220° C., or about 120° C. to about 200° C., for about 20 minutes to about 2 hours, or about 40 minutes to about 80 minutes. When the above-described additional cross-linking conditions are satisfied, the surface of the super absorbent polymer particles is sufficiently cross-linked to increase absorbency under pressure.

The heating means for the additional cross-linking reaction is not particularly limited. It is possible to provide a thermal media thereto or provide a heat source directly thereto. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present invention is not limited thereto.

Hereinafter, the present invention will be described in more detail with reference to examples. However, these examples are for illustrative purposes only, and the invention is not intended to be limited by these examples.

EXAMPLES

Preparation of Super Absorbent Polymer

Example 1

(First step) 100 g (1.388 mol) of acrylic acid, 0.16 g of polyethylene glycol diacrylate (Mn=508) as a cross-linking agent, 0.008 g of diphenyl (2,4,6-trimethylbenzoyl)phosphine oxide as a photopolymerization initiator, 0.12 g of sodium persulfate as a thermal polymerization initiator and 123.5 g of a 32% caustic soda solution were mixed in a 3L glass container equipped with a stirrer and a thermometer at room temperature to prepare a monomer composition (degree of neutralization of acrylic acid: 70 mol %, solid content: 45 wt %).

Thereafter, the monomer composition was supplied at 500 to 2000 mL/min on a conveyor belt in which a belt having a width of 10 cm and a length of 2 m rotates at a speed of 50 cm/min. And, at the same time as the monomer composition was supplied, ultraviolet rays having an intensity of 10 mW/cm$^2$ were irradiated to perform a polymerization reaction for 60 seconds, thereby obtaining a hydrogel polymer having a moisture content of 55 wt %.

(Second step) Subsequently, sodium stearoyl-2-lactylate (Almax-6900, manufactured by Ilshin Wells) represented by the following Chemical Formula 1-6 was added to the hydrogel polymer obtained by the above polymerization reaction in the form of an aqueous solution (sodium stearoyl-2-lactylate 3 wt %) in hot water such that the content was 0.4 parts by weight based on 100 parts by weight of the hydrogel polymer. Then, the mixture was pulverized using a meat chopper, and cut through a perforated plate having a hole size of 1 mm. Herein, the moisture content of hydrous super absorbent polymer particles contained in the final pulverized product was 50 wt %.

(Third step) Thereafter, 1.0 parts by weight of hydrophobic particles, methylsilsesquioxane (Tospearl® 120, average particle diameter: 2 μm, water contact angle: 117°, manufactured by Momentive), were added to the pulverized product based on 100 parts by weight of the hydrogel polymer, and mixed using a shaker for 5 minutes.

(Step 4) Thereafter, the mixture was dried at 220° C. for 50 minutes using a rotary dryer (1.2 revolutions/minute, capacity: 5L) to prepare a super absorbent polymer having a moisture content of less than 5 wt %.

[Chemical Formula 1-6]

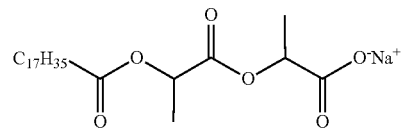

Example 2

A super absorbent polymer was prepared in the same manner as in Example 1, except that methylsilsesquioxane (Tospearl® 2000B, average particle diameter: 4 to 8 μm, manufactured by Momentive) was added instead of methylsilsesquioxane (Tospearl® 120) as the hydrophobic particles.

Example 3

A super absorbent polymer was prepared in the same manner as in Example 1, except that hydrophobic fumed silica surface-modified with polydimethylsiloxane (PDMS) (AEROSIL® R 202, water contact angle: 128°, manufactured by Evonik) was added instead of methylsilsesquioxane (Tospearl® 120) as the hydrophobic particles.

Example 4

A super absorbent polymer was prepared in the same manner as in Example 1, except that hydrophobic fumed silica surface-modified with dimethyldichlorosilane (DDS) (AEROSIL® R 974, water contact angle: 105°, manufactured by Evonik) was added instead of methylsilsesquioxane (Tospearl® 120) as the hydrophobic particles.

Example 5

A super absorbent polymer was prepared in the same manner as in Example 1, except that kaolin obtained from Sigma-Aldrich (water contact angle: 94°) was added instead of methylsilsesquioxane (Tospearl® 120) as the hydrophobic particles.

Example 6

A super absorbent polymer was prepared in the same manner as in Example 1, except that sodium lauroyl lactylate represented by the following Chemical Formula 1-7 (manufactured by Ilshin Wells) was used instead of sodium stearoyl-2-lactylate as the carboxylic acid-based additive.

[Chemical Formula 1-7]

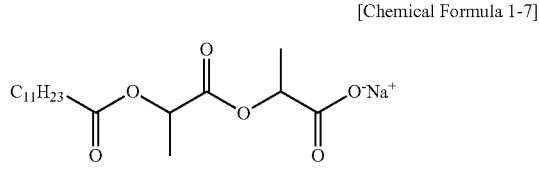

Comparative Example 1

A super absorbent polymer was prepared in the same manner as in Example 1, except that hydrophobic particles were not used in Example 1.

Comparative Example 2

A super absorbent polymer was prepared in the same manner as in Example 1, except that polydimethylsiloxane (KF-96-1,000 cs, manufactured by Shin-Etsu) was added instead of the hydrophobic particles, methylsilsesquioxane (Tospearl® 120).

Comparative Example 3

A super absorbent polymer was prepared in the same manner as in Example 1, except that untreated fumed silica (AEROSIL® 300, water contact angle: 35°, manufactured by Evonik) was added instead of the hydrophobic particles, methylsilsesquioxane (Tospearl® 120).

Comparative Example 4

A super absorbent polymer was prepared in the same manner as in Example 1, except that untreated wet silica (Sipernat® 22S, water contact angle: 31°, manufactured by Evonik) was added instead of the hydrophobic particles, methylsilsesquioxane (Tospearl® 120).

Comparative Example 5

A super absorbent polymer was prepared in the same manner as in Example 1, except that phyllosilicate (Optigel, water contact angle: 32°, manufactured by BYK-Chem) was added instead of the hydrophobic particles, methylsilsesquioxane (Tospearl® 120).

Comparative Example 6

A super absorbent polymer was prepared in the same manner as in Example 1, except that Hydrotalcite (water contact angle: 42°, manufactured by Kisuma Chemicals) was added instead of the hydrophobic particles, methylsilsesquioxane (Tospearl® 120).

Comparative Example 7

A super absorbent polymer was prepared in the same manner as in Example 1, except that Sepiolite obtained from Sigma-Aldrich (water contact angle: 66°) was added instead of the hydrophobic particles, methylsilsesquioxane (Tospearl® 120).

Comparative Example 8

A super absorbent polymer was prepared in the same manner as in Example 1, except that magnesium stearate (manufactured by Sigma-Aldrich) was added instead of sodium stearoyl-2-lactylate as the carboxylic acid-based additive.

Experimental Example 1

Surface Image Analysis of Super Absorbent Polymer

For surface analysis of the super absorbent polymers prepared in Examples 1, 2, 3, 4 and Comparative Example 1, SEM analysis was performed on each surface, and the images are shown in FIGS. 1 to 5.

In the super absorbent polymers prepared in Examples 1 to 4 unlike the super absorbent polymer prepared in Comparative Example 1 in which hydrophobic particles were not added, hydrophobic particles are physically well adsorbed to the surface of the super absorbent polymer. This is believed to be because the carboxylic acid-based additive is not only fine particles compared to the hydrophobic particles, but is added in the form of a solution dissolved in water, a solvent, during the manufacturing process, so that does not remain in the form of particles on the surface of the final super absorbent polymer.

Experimental Example 2

Analysis of Content of Carboxylic Acid-Based Additive

The super absorbent polymer prepared in one of Example 1 and Comparative Example 1 was subjected to high-performance liquid chromatography (HPLC) to measure the content of additives contained in the super absorbent polymer, respectively, and the results are shown in Table 1 below.

① After adding 1 ml of distilled water to 1.0±0.0001 g of the final super absorbent polymer composition, it was sufficiently swelled for 1 hour.

② 6 mL of a solvent (MeOH:Methylene chloride=2:1 v/v) was added to the swollen super absorbent polymer composition, followed by filtering after 4 hours to extract only a solution part, which was used as a sample solution.

③ The content of the additive dissolved in the sample solution was quantified by passing the sample solution through high-performance liquid chromatography (HPLC) to determine the content of residual material. At this time, the measurement conditions of high-performance liquid chromatography (HPLC) are as follows:

column: Acquity BEH $C_{18}$ (2.1 mm I.D.×50 mm L, particle size: 1.7m)
Mobile phase A: ACN (Acetonitrile (0.1% trifluoroacetic acid))
Mobile phase B: D.I Water (0.1% trifluoroacetic acid)
column temp.: 40° C.
Flow rate: 0.4 mL/min

TABLE 1

| | Additive | Additive content [1] (wt %) |
|---|---|---|
| Example 1 | 1-6 | 0.3178 |
| Comparative Example 1 | — | 0 |

[1] in wt % based on the total weight of the super absorbent polymer

Referring to Table 1, it was confirmed that sodium stearoyl-2-lactylate represented by Chemical Formula 1-6 was present in the super absorbent polymer prepared in Example 1, unlike the super absorbent polymer composition prepared in Comparative Example 1.

Experimental Example 3

Evaluation of Super Absorbent Polymer Properties

For the super absorbent polymers prepared in Examples and Comparative Examples, the proportion of large powder, centrifuge retention capacity (CRC), and absorbency under pressure (AUP) were measured in the following manner, and the results are shown in Table 2 below.

(1) Evaluation of proportion of large powder

In order to measure the content of large powder, which are particles having a particle diameter greater than 850 μm, contained in the super absorbent polymer prepared in one of Examples and Comparative Examples, the super absorbent polymer was passed through 20 mesh to measure the content, and the proportion of large powder was calculated by the method of Equation 1:

$$\text{Proportion of large powder (\%)} = [(\text{content of particles exceeding 850 μm that did not pass through 20 mesh})/(\text{total content of particles})]*100 \quad \text{[Equation 1]}$$

(2) Centrifuge retention capacity (CRC)

The centrifuge retention capacity by absorption ratio under a non-loading condition of each polymer composition was measured according to the EDANA (European Disposables and Nonwovens Association) WSP 241.3.

Specifically, a polymer composition was obtained by classifying each of the polymer compositions prepared in Examples and Comparative Examples through a sieve of #30-50. After inserting $W_0$ (g, about 0.2 g) of the polymer composition uniformly in a nonwoven fabric envelope and sealing the same, it was soaked in saline (0.9 wt %) at room temperature. After 30 minutes, the envelope was centrifuged at 250G for 3 minutes to drain, and the weight W2 (g) of the envelope was measured. Further, after carrying out the same operation without using the polymer, the weight Wi (g) of the envelope was measured.

Then, CRC (g/g) was calculated by using the obtained weight values according to the following Equation 2.

$$\text{CRC (g/g)} = \{[W_2(g) - W_1(g)]/W_0(g)\} - 1 \quad \text{[Equation 2]}$$

(3) Absorbency under Pressure (AUP)

The absorbency under pressure at 0.7 psi of the super absorbent polymer prepared in one of Examples and Comparative Examples was measured according to the EDANA WSP 242.3.

First, in the measurement of the absorbency under pressure, the classified polymer of the above CRC measurement was used.

Specifically, a 400 mesh stainless steel screen was installed in a cylindrical bottom of a plastic having an inner diameter of 25 mm. $W_0$ (g, 0.16 g) of the super absorbent polymer composition was uniformly scattered on the screen at room temperature and a humidity of 50%. Thereafter, a piston which can uniformly provide a load of 0.7 psi was placed on the composition. Herein, the outer diameter of the piston was slightly smaller than 25 mm, there was no gap with the inner wall of the cylinder, and jig-jog of the cylinder was not interrupted. At this time, the weight W3 (g) of the device was measured.

Subsequently, a glass filter having a diameter of 90 mm and a thickness of 5 mm was placed in a petri dish having a diameter of 150 mm, and saline (0.9 wt % sodium chloride) was poured in the dish. At this time, the saline was poured until the surface level of the saline became equal to the upper surface of the glass filter. One sheet of filter paper with a diameter of 90 mm was placed thereon. After the measuring device was placed on the filter paper, the liquid was absorbed for 1 hour under a load. After 1 hour, the measuring device was lifted, and the weight $W_4$ (g) was measured.

Then, absorbency under pressure (g/g) was calculated by using the obtained weight values according to the following Equation 3.

$$\text{AUP(g/g)} = [W_4(g) - W_3(g)]/W_0(g) \quad \text{[Equation 3]}$$

TABLE 2

| | Carboxylic acid-based additive | Hydrophobic particles | Proportion of large powder (%) | SAP properties | |
|---|---|---|---|---|---|
| | | | | CRC (g/g) | AUP (g/g) |
| Ex. 1 | Compound 1-6 | Tospearl ® 120 | 20.1 | 38.2 | 21.1 |

TABLE 2-continued

| | Carboxylic acid-based additive | Hydrophobic particles | Proportion of large powder (%) | SAP properties CRC (g/g) | AUP (g/g) |
|---|---|---|---|---|---|
| Ex. 2 | Compound 1-6 | Tospearl ® 2000B | 28.5 | 39.1 | 21.1 |
| Ex. 3 | Compound 1-6 | AEROSIL ® R 202 | 31.3 | 39.3 | 22.4 |
| Ex. 4 | Compound 1-6 | AEROSIL ® R 974 | 35.5 | 39.2 | 22.0 |
| Ex. 5 | Compound 1-6 | Kaolin | 28.8 | 40.8 | 24.8 |
| Ex. 6 | Compound 1-7 | Tospearl ® 120 | 17.4 | 37.5 | 20.9 |
| Comp. Ex. 1 | Compound 1-6 | — | 42.8 | 37.6 | 21.1 |
| Comp. Ex. 2 | Compound 1-6 | KF-96-1,000 cs | 60.2 | 20.4 | 10.4 |
| Comp. Ex. 3 | Compound 1-6 | AEROSIL ® 300 | 68.6 | 28.5 | 16.7 |
| Comp. Ex. 4 | Compound 1-6 | Sipernat ® 22S | 70.1 | 29.0 | 15.2 |
| Comp. Ex. 5 | Compound 1-6 | phyllosilicate | 56.7 | 32.5 | 22.4 |
| Comp. Ex. 6 | Compound 1-6 | hydrotalcite | 54.5 | 33.7 | 18.5 |
| Comp. Ex. 7 | Compound 1-6 | sepiolite | 81.6 | 35.2 | 18.4 |
| Comp. Ex. 8 | Magnesium stearate | Tospearl ® 120 | 80.8 | 36.9 | 17.5 |

Referring to Table 2, it was confirmed that the super absorbent polymers of Examples 1 to 6 prepared by adding the hydrophobic particles before the drying process in the preparation of the super absorbent polymer not only exhibited a significantly lower proportion of large powder, but also had equal or higher absorbency and improved water retention capacity, compared to the super absorbent polymer of Comparative Example 1 prepared without adding such hydrophobic particles.

On the other hand, it was confirmed that the super absorbent polymer of Comparative Example 2 using a liquid material instead of the hydrophobic particles of Examples and the super absorbent polymers of Comparative Examples 3 to 8 using non-hydrophobic particles exhibited a higher proportion of large powder and reduced absorption performance compared to the super absorbent polymer of Comparative Example 1.

Accordingly, it can be seen that when the hydrophobic particles are used to prepare the super absorbent polymer, it is possible to prepare a super absorbent polymer with improved absorption performance while suppressing agglomeration between the pulverized hydrogel polymer particles to have a uniform particle size distribution.

The invention claimed is:

1. A super absorbent polymer comprising
  super absorbent polymer particles containing a cross-linked polymer of a water-soluble ethylene-based unsaturated monomer having at least partially neutralized acidic groups and a cross-linking agent;
  hydrophobic particles; and
  a carboxylic acid-based additive,
  wherein the carboxylic acid-based additive is at least one selected from the group consisting of a carboxylic acid represented by the following Chemical Formula 1 and a salt thereof:

[Chemical Formula 1]

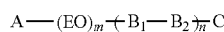

in Chemical Formula 1,
A is alkyl having 5 to 21 carbon atoms,
EO is ethylene oxide (—CH$_2$CH$_2$O—),
m is an integer of 0 to 8,
B$_1$ is —OCO—, —COO—, or —COOCH(R$_1$)COO—,
  wherein R$_1$ is alkyl having 1 to 5 carbon atoms,
B$_2$ is alkylene having 1 to 5 carbon atoms, alkenylene having 2 to 5 carbon atoms, or alkynylene having 2 to 5 carbon atoms,
n is an integer of 1 to 3, and
C is a carboxyl group.

2. The super absorbent polymer according to claim 1, wherein at least some of the hydrophobic particles are present on a surface of the super absorbent polymer particles.

3. The super absorbent polymer according to claim 1, wherein the hydrophobic particles are at least one selected from the group consisting of hydrophobic silicone resin particles, hydrophobic silica particles and hydrophobic clay particles.

4. The super absorbent polymer according to claim 3, wherein the hydrophobic silicone resin is polyorganosilsesquioxane.

5. The super absorbent polymer according to claim 3, wherein the hydrophobic silica is fumed silica surface-modified by a surface treatment agent selected from the group consisting of dimethyldichlorosilane (DDS), polydimethylsiloxane (PDMS) and hexamethyldisilazane (HMDS).

6. The super absorbent polymer according to claim 3, wherein the hydrophobic clay is at least one selected from the group consisting of kaolin, sericite, pyrophyllite, montmorillonite, bentonite and acid clay.

7. The super absorbent polymer according to claim 1, wherein in Chemical Formula 1,
A is —C$_6$H$_{13}$, —C$_{11}$H$_{23}$, —C$_{12}$H$_{25}$, —C$_{17}$H$_{35}$, or —C$_{18}$H$_{37}$.

8. The super absorbent polymer according to claim 1, wherein in Chemical Formula 1,
B$_1$ is

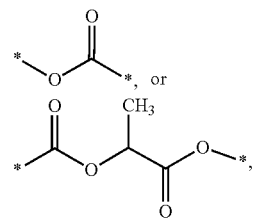

wherein * is a bonding site with a neighboring atom.

9. The super absorbent polymer according to claim 1, wherein in Chemical Formula 1,
B$_2$ is

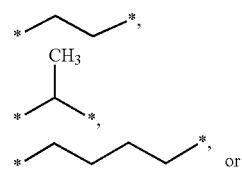

-continued

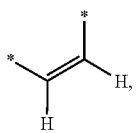

wherein * is a bonding site with a neighboring atom.

10. The super absorbent polymer according to claim 1, wherein the salt of Chemical Formula 1 is at least one selected from the group consisting of an alkali metal salt thereof and an alkaline earth metal salt thereof.

11. The super absorbent polymer of claim 1, wherein the carboxylic acid-based additive is any one of compounds represented by the following Chemical Formulae 1-1 to 1-9:

1-1
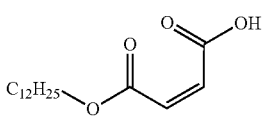

1-2
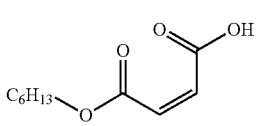

1-3
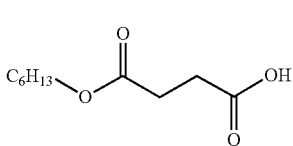

1-4
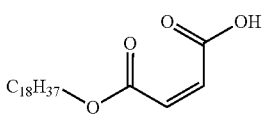

1-5
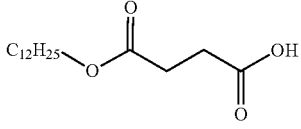

1-6
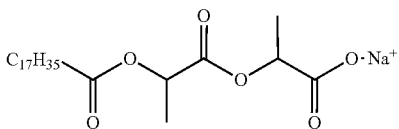

1-7
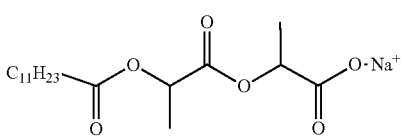

1-8
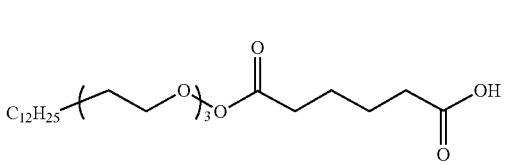

1-9
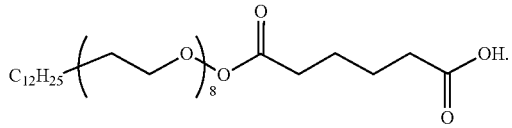

12. A preparation method of a super absorbent polymer, comprising
forming a hydrogel polymer by cross-linking polymerization of a water-soluble ethylene-based unsaturated monomer having at least partially neutralized acidic groups in the presence of a cross-linking agent and a polymerization initiator;
mixing the hydrogel polymer with a carboxylic acid-based additive, followed by pulverization to prepare a pulverized product;
mixing the pulverized product with hydrophobic particles to prepare a mixture; and
drying the mixture,
wherein the carboxylic acid-based additive is at least one selected from the group consisting of a carboxylic acid represented by the following Chemical Formula 1 and a salt thereof:

[Chemical Formula 1]
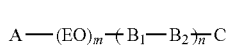

in Chemical Formula 1,
A is alkyl having 5 to 21 carbon atoms,
EO is ethylene oxide (—$CH_2CH_2O$—),
m is an integer of 0 to 8,
$B_1$ is —OCO—, —COO—, or —COOCH($R_1$)COO—,
wherein $R_1$ is alkyl having 1 to 5 carbon atoms,
$B_2$ is alkylene having 1 to 5 carbon atoms, alkenylene having 2 to 5 carbon atoms, or alkynylene having 2 to 5 carbon atoms,
n is an integer of 1 to 3, and
C is a carboxyl group.

13. The preparation method of a super absorbent polymer according to claim 12,
wherein the carboxylic acid-based additive is used in an amount of 0.01 to 10 parts by weight based on 100 parts by weight of the hydrogel polymer.

14. The preparation method of a super absorbent polymer according to claim 12,
wherein the carboxylic acid-based additive is mixed in the form of a solution dissolved in a solvent.

15. The preparation method of a super absorbent polymer according to claim 12,
wherein the hydrophobic particles are used in an amount of 0.1 to 10 parts by weight based on 100 parts by weight of the hydrogel polymer.

16. The preparation method of a super absorbent polymer according to claim 12,
wherein the hydrophobic particles are dry-mixed.

17. The preparation method of a super absorbent polymer of claim 12,
wherein the prepared super absorbent polymer contains less than 40 wt % of large powder having a particle diameter of greater than 850 μm based on a total weight of the prepared super absorbent polymer.

* * * * *